United States Patent
Lee et al.

(10) Patent No.: US 11,129,094 B2
(45) Date of Patent: Sep. 21, 2021

(54) ELECTRONIC DEVICE FOR REQUESTING NSSAI IN WIRELESS COMMUNICATION NETWORK AND METHOD THEREOF

(71) Applicant: Samsung Electronics Co., Ltd, Suwon-si (KR)

(72) Inventors: Soomin Lee, Suwon-si (KR); Seonmi Kim, Suwon-si (KR); Kyunghoon Lee, Suwon-si (KR); Hyejeong Kim, Suwon-si (KR); Sangho Lee, Suwon-si (KR); Sunmin Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 55 days.

(21) Appl. No.: 16/742,805

(22) Filed: Jan. 14, 2020

(65) Prior Publication Data
US 2020/0229079 A1 Jul. 16, 2020

(30) Foreign Application Priority Data
Jan. 14, 2019 (KR) .................... 10-2019-0004478

(51) Int. Cl.
*H04W 48/18* (2009.01)
*H04W 48/08* (2009.01)
(Continued)

(52) U.S. Cl.
CPC .......... *H04W 48/18* (2013.01); *H04W 48/02* (2013.01); *H04W 48/08* (2013.01); *H04W 60/00* (2013.01)

(58) Field of Classification Search
None
See application file for complete search history.

(56) References Cited

U.S. PATENT DOCUMENTS

2018/0103368 A1   4/2018   Son et al.
2019/0124561 A1*  4/2019   Faccin ............... H04W 48/18
(Continued)

FOREIGN PATENT DOCUMENTS

WO   2018/093168 A1   5/2018
WO   2018142200 A1    8/2018
WO   2018236819 A1   12/2018

OTHER PUBLICATIONS

International Search Report and Written Opinion of the International Searching Authority in connection with International Application No. PCT/KR2020/000322 dated May 8, 2020, 9 pages.
(Continued)

*Primary Examiner* — Hong S Cho

(57) ABSTRACT

An electronic device is disclosed. The electronic device includes a wireless communication circuitry, a processor operatively connected with the wireless communication circuitry, and a memory, operatively connected with the processor, storing configured network slice selection assistance information (NSSAI) and an application. The memory stores instructions, when executed, causing the processor to, when the electronic device is booted, identify a single-NSSAI (s-NSSAI) candidate group including at least one s-NSSAI, based on configuration information of the application, determine a specified number of s-NSSAIs among at least one s-NSSAI included in the configured NSSAI as a first requested NSSAI based on the number of s-NSSAIs included in the configured NSSAI and the s-NSSAI candidate group, and transmit a first registration request message including the first requested NSSAI, via the wireless communication circuitry.

20 Claims, 15 Drawing Sheets

(51) Int. Cl.
*H04W 60/00* (2009.01)
*H04W 48/02* (2009.01)

(56) References Cited

U.S. PATENT DOCUMENTS

2019/0357129 A1    11/2019  Park et al.
2019/0364495 A1    11/2019  Mildh et al.
2020/0107250 A1*   4/2020   So .................... H04W 48/18

OTHER PUBLICATIONS

3GPP TR 23.740 V16.0.0 (Dec. 2018), Technical Report, 3rd Generation Partnership Project; Technical Specification Group Services and System Aspects; Study on Enhancement of Network Slicing (Release 16), Dec. 2018, 70 pages.
Intel, "Updates to handling of S-NSSAI mapping information," C1-182191, 3GPP TSG-CT WG1 Meeting #109, Montreal (Canada), Feb. 26-Mar. 2, 2018, 4 pages.
Vivo, "UE registered slices information at gNB," R2-1802080, Revision of R2-1800862, 3GPP TSG-RAN WG2 #101, Athens, Greece, Feb. 26-Mar. 2, 2018, 2 pages.

* cited by examiner

- Allowed NSSAI = a + ab + ac + abc
- App NSSAI = b + ab + bc + abc + bd
- Rejected NSSAI = c + ac + bc + abc
- Configured NSSAI = a + ab + abc + ac + c + bc + bd + d

- Allowed NSSAI = a + ab + ac + abc + abf + abcf + acf + f
- App NSSAI = b+ ab+ bc + abc + bd + abf + abcf
- Rejected NSSAI = c + ac + bc + abc + acf + abcf
- Configured NSSAI = a + ab + abc + ac + c + bc
      + bd + d + f + abf + acf + abcf
- Last Allowed NSSAI = f + abf + abcf + acf

ELECTRONIC DEVICE FOR REQUESTING NSSAI IN WIRELESS COMMUNICATION NETWORK AND METHOD THEREOF

CROSS-REFERENCE TO RELATED APPLICATION

This application is based on and claims priority under 35 U.S.C. § 119 to Korean Patent Application No. 10-2019-0004478 filed on Jan. 14, 2019 in the Korean Intellectual Property Office, the disclosure of which is incorporated by reference herein its entirety.

BACKGROUND

1. Field

The disclosure relates to an electronic device for requesting network slice selection assistance information (NSSAI) in a wireless communication network and a method thereof.

2. Description of Related Art

A $5^{th}$ generation (5G) network which is being developed by $3^{rd}$ generation partnership project (3GPP) includes a network slice technology. The network slice may refer to a logical network connection unit for data transfer. In the 5G network, a core network may establish a plurality of different logical networks with the same physical equipment using network function virtualization (NFV) or software defined networking (SDN), such that an electronic device may receive different types of services or may receive services, each of has different quality, through different network slices.

A standard specification (e.g., technical specification (TS) 23.501 and 23.502) of the 5G network defines an NSSAI including information about a network slice. The NSSAI may indicate information about a plurality of slices, and information about one network slice may be referred to as a single-NSSAI (s-NSSAI).

The above information is presented as background information only to assist with an understanding of the present disclosure. No determination has been made, and no assertion is made, as to whether any of the above might be applicable as prior art with regard to the present disclosure.

SUMMARY

A standard specification of a 5G network defines a configured NSSAI, a requested NSSAI, an allowed NSSAI, and a rejected NSSAI. The configured NSSAI may indicate a network slice provisioned from an electronic device applicable to one or more public land mobile networks (PLMNs). The configured NSSAI may be designated by a network (e.g., a network operator). The configured NSSAI may be previously stored or may be updated through a separate procedure. The requested NSSAI may include at least one s-NSSAI determined by the electronic device. The electronic device may determine at least one s-NSSAI included in the configured NSSAI as a requested NSSAI and may transmit a message including the requested NSSAI to a network. The allowed NSSAI and the rejected NSSAI may be included in a message received from the network. The allowed NSSAI may indicate a network slice which is allowed for the electronic device based on the requested NSSAI, and the rejected NSSAI may indicate a network slice which is not allowed for the electronic device.

Due to a difference between the number of s-NSSAIs (a maximum of 16 s-NSSAIs) the electronic device may select and the number of s-NSSAIs (a maximum of 8 s-NSSAIs) the electronic device may request, the electronic device may fail to select a network slice suitable for a service type or quality of service (QoS) of an application.

Aspects of the disclosure are to address at least the above-mentioned problems and/or disadvantages and to provide at least the advantages described below. Accordingly, an aspect of the disclosure is to provide an electronic device for determining a requested NSSAI in a 5G network and transmitting the determined requested NSSAI and a method thereof.

In accordance with an aspect of the disclosure, an electronic device is provided. The electronic device may include a wireless communication circuitry, a processor operatively connected with the wireless communication circuitry, and a memory, operatively connected with the processor, storing configured network slice selection assistance information (NSSAI) and an application. The memory may store instructions, when executed, causing the processor to, when the electronic device is booted, identify a single-NSSAI (s-NSSAI) candidate group including at least one s-NSSAI, based on configuration information of the application, determine a specified number of s-NSSAIs among at least one s-NSSAI included in the configured NSSAI as a first requested NSSAI based on the number of s-NSSAIs included in the configured NSSAI and the s-NSSAI candidate group, and transmit a first registration request message including the first requested NSSAI, via the wireless communication circuitry.

In accordance with another aspect of the disclosure, an electronic device for supporting a wireless communication network is provided. The electronic device may include a wireless communication circuitry, a processor operatively connected with the wireless communication circuitry, and a memory, operatively connected with the processor, storing a configured NSSAI and an application. The memory may store instructions, when executed, causing the processor to, when the electronic device is booted, identify an s-NSSAI candidate group including at least one s-NSSAI based on configuration information of the application, identify a state of the electronic device, determine at least one s-NSSAI included in the configured NSSAI as a first requested NSSAI based on the state of the electronic device and the s-NSSAI candidate group, and transmit a first registration request message including the first requested NSSAI, via the wireless communication circuitry.

In accordance with another aspect of the disclosure, a method of an electronic device is provided. The method may include, when the electronic device is booted, identifying an s-NSSAI candidate group including at least one s-NSSAI based on configuration information of an application, determining a specified number of s-NSSAIs included in a configured NSSAI as a first requested NSSAI based on the number of s-NSSAIs included in the configured NSSAI and the s-NSSAI candidate group, and transmitting a first registration request message including the first requested NSSAI.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
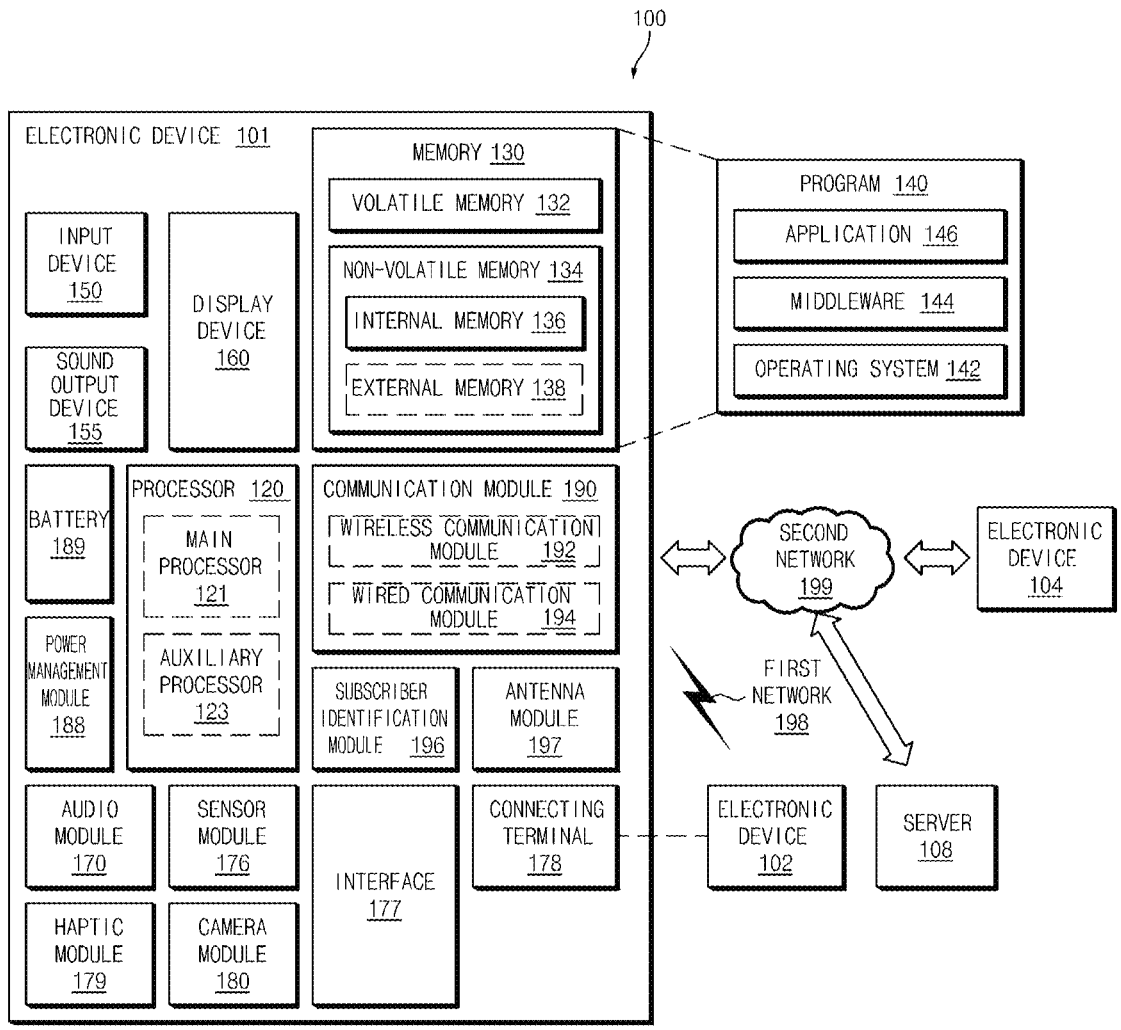
FIG. 1 illustrates a block diagram of an electronic device in a network environment according to various embodiments.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
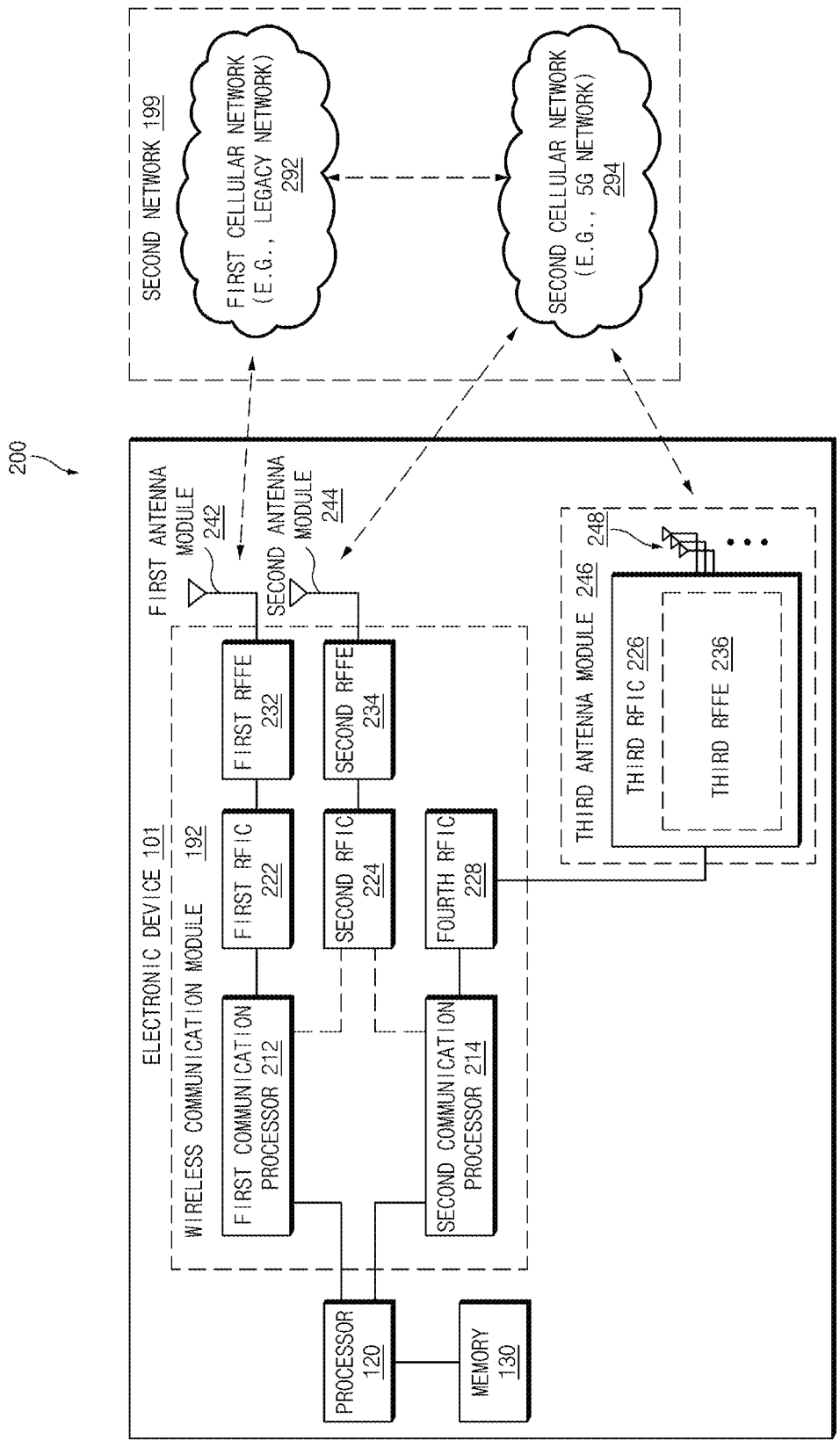
FIG. 2 illustrates a block diagram of an electronic device for supporting legacy network communication and 5G network communication according to various embodiments.

FIG. 2 illustrates a block diagram 200 of an electronic device 101 for supporting legacy network communication and 5G network communication according to various embodiments.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, the second RFFE 234, a first antenna module 242, a second antenna module 244, and an antenna 248. The electronic device 101 may further include a processor 120 and a memory 130. A second network 199 may include a first network 292 and a second network 294. According to another embodiment, the electronic device 101 may further include at least one of the components shown in FIG. 1. The second network 199 may further include at least one other network. According to an embodiment, the first communication processor 212, the second communication processor 214, the first RFIC 222, the second RFIC 224, the fourth RFIC 228, the first RFFE 232, and the second RFFE 234 may configure at least a part of a wireless communication module 192 of FIG. 1. According to another embodiment, the fourth RFIC 228 may be omitted or may be included as a part of the third RFIC 226.

The first communication processor 212 may establish a communication channel of a band to be used for wireless communication with the first network 292 and may support legacy network communication over the established communication channel. According to various embodiments, the first network 292 may be a legacy network including a $2^{nd}$ generation (2G), $3^{rd}$ generation (3G), $4^{th}$ generation (4G), or long term evolution (LTE) network. The second communication processor 214 may establish a communication channel corresponding to a specified band (e.g., about 6 GHz to about 60 GHz) among bands to be used for wireless communication with the second network 294 and may support 5G network communication over the established communication channel. According to various embodiments, the second network 294 may be a 5G network defined in $3^{rd}$ generation partnership project (3GPP). In addition, according to an embodiment, the first communication processor 212 or the second communication processor 214 may establish a communication channel corresponding to another specified band (e.g., about 6 GHz or less) among bands used for wireless communication with the second network 294 and may support 5G network communication over the established communication channel. According to an embodiment, the first communication processor 212 and the second communication processor 214 may be implemented in a single chip or a single package. According to various embodiments, the first communication processor 212 or the second communication processor 214 may be configured with the processor 120, an auxiliary processor 123, or a communication module 190 in a single chip or a single package.

Upon transmission, the first RFIC 222 may convert a baseband signal generated by the first communication processor 212 into an RF signal of about 700 MHz to about 3 GHz used for the first network 292 (e.g., the legacy network). Upon reception, an RF signal may be obtained from the first network 292 (e.g., the legacy network) via an antenna (e.g., the first antenna module 242) and may be preprocessed via an RFFE (e.g., the first RFFE 232). The first RFIC 222 may convert the preprocessed RF signal into a baseband signal to be able to be processed by the first communication processor 212.

Upon transmission, the second RFIC 224 may convert a baseband signal generated by the first communication processor 212 or the second communication processor 214 into an RF signal of a Sub6 band (e.g., about 6 GHz or less) (hereinafter referred to as "5G Sub6 RF signal") used for the second network 294 (e.g., the 5G network). Upon reception, a 5G Sub6 RF signal may be obtained from the second network 294 (e.g., the 5G network) via an antenna (e.g., the second antenna module 244) and may be preprocessed via an RFFE (e.g., the second RFFE 234). The second RFIC 224 may convert the preprocessed 5G Sub6 RF signal into a baseband signal to be able to be processed by a corresponding communication processor between the communication processor 212 or the second communication processor 214.

The third RFIC 226 may convert a baseband signal generated by the second communication processor 214 into an RF signal of a 5G Above6 band (e.g., about 6 GHz to about 60 GHz) (hereinafter referred to as "5G Above6 RF signal") to be used in the second network 294 (e.g., the 5G network). Upon reception, a 5G Above6 RF signal may be obtained from the second network 294 (e.g., the 5G network) via an antenna (e.g., the antenna 248) and may be preprocessed via the third RFFE 236. The third RFIC 226 may convert the preprocessed 5G Above6 RF signal into a baseband signal to be able to be processed by the second communication processor 214. According to an embodiment, the third RFFE 236 may be configured as a part of the third RFIC 226.

According to an embodiment, the electronic device 101 may include the fourth RFIC 228 independently of the third RFIC 226 or as at least a part of the third RFIC 226. In this case, the fourth RFIC 228 may convert a baseband signal generated by the second communication processor 214 into an RF signal of an intermediate frequency band (e.g., about 9 GHz to about 11 GHz) (hereinafter referred to as "IF signal") and may delivery the IF signal to the third RFIC 226. The third RFIC 226 may convert the IF signal into a 5G Above6 RF signal. Upon reception, a 5G Above6 RF signal may be received from the second network 294 (e.g., the 5G network) via an antenna (e.g., the antenna 248) and may be converted into an IF signal by the third RFIC 226. The fourth RFIC 228 may convert the IF signal into a baseband signal to be able to be processed by the second communication processor 214.

According to an embodiment, the first RFIC 222 and the second RFIC 224 may be implemented as at least a part of a single chip or a single package. According to an embodiment, the RFFE 232 and the second RFFE 234 may be implemented as at least a part of a single chip or a single package. According to an embodiment, at least one of the first antenna module 242 or the second antenna module 244 may be omitted or may be combined with another antenna module to process RF signals of a plurality of corresponding bands.

According to an embodiment, the third RFIC 226 and the antenna 248 may be arranged on the same substrate to configure a third antenna module 246. For example, the wireless communication module 192 or the processor 120 may be arranged on a first substrate (e.g., a main printed circuit board (PCB)). In this case, as the third RFIC 226 is disposed on a partial region (e.g., a lower surface) of a second substrate (e.g., a sub-PCB) independent of the first substrate and as the antenna 248 is disposed on another partial region (e.g., an upper surface), the third antenna module 246 may be configured. According to an embodiment, the antenna 248 may include, for example, an antenna array which is available for beamforming. As the third RFIC 226 and the antenna 248 are arranged on the same substrate, it is possible to reduce a length of a transmission line between the third RFIC 226 and the antenna 248. This may reduce that, for example, a signal of a high frequency band (e.g., about 6 GHz to about 60 GHz) used for 5G network communication is lost (e.g., attenuated) by the transmission line. Due to this, the electronic device 101 may enhance quality or speed of communication with the second network 294 (e.g., the 5G network).

The second network 294 (e.g., the 5G network) may be operated independently of the first network 292 (e.g., the legacy network) (e.g., stand-alone (SA)) or may be connected and operated with the first network 292 (e.g., the legacy network) (e.g., non-standalone (NSA)). For example, there may be only an access network (e.g., a 5G radio access network (RAN) or a next generation RAN (NG RAN)) in the 5G network and there may be no core network (e.g., next generation core (NGC)) in the 5G network. In this case, the electronic device 101 may access the access network of the 5G network and may access an external network (e.g., the Internet) under control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130 and may be accessed by another component (e.g., the processor 120, the first communication processor 212, or the second communication processor 214).

Figure 3:
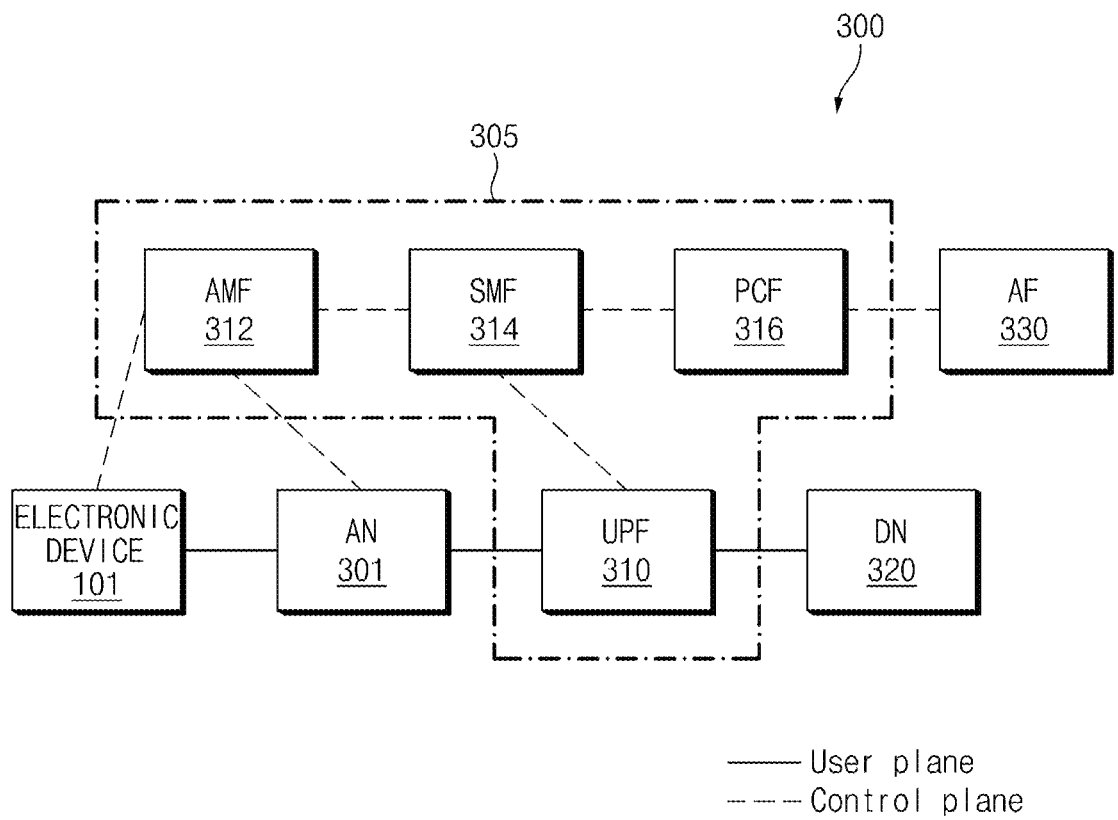
FIG. 3 illustrates a drawing of an architecture of a network according to various embodiments.

FIG. 3 illustrates a drawing of an architecture of a network according to various embodiments.

Referring to FIG. 3, a network environment 300 may include an electronic device 101 (e.g., an electronic device 101 of FIG. 1) and a 5G network defined in $3^{rd}$ generation partnership project (3GPP). Functions, structures, and arrangement of components shown in FIG. 3 may be implemented with reference to TS 23.501. Each of the components included in the network environment 300 may refer to a physical entity unit or may refer to a software or module unit capable of performing a separate function. In the network environment 300, a user plane may refer to a path for transmitting and receiving a data packet required for a user of the electronic device 101 to receive a service, and a control plane may refer to a path for transmitting and receiving a control signal for connection, management, or disconnection of a network used to transmit a data packet.

According to an embodiment, the electronic device 101 may refer to a device used by the user. The electronic device 101 may refer to, for example, a terminal, user equipment (UE), a mobile station, a subscriber station, a remote terminal, a wireless terminal, or a user device.

According to an embodiment, an access network (AN) 301 may provide a channel for wireless communication with the electronic device 101. The AN 301 may refer to a radio access network (RAN), a base station, an eNodeB (eNB), a 5G node, a transmission/reception point (TRP), or a $5^{th}$ generation NodeB (SGNB).

According to an embodiment, a data network (DN) 320 may transmit and receive data (or a data packet) with the electronic device 101 over a core network (CN) 305 and the AN 301 to provide a service (e.g., an Internet service or an Internet protocol (IP) multimedia subsystem (IMS)) to the electronic device 101.

According to an embodiment, the CN 305 may include a user plane function (UPF) node 310, an access & mobility management function (AMF) node 312, a session management function (SMF) node 314, and a policy control function (PCF) node 316. The types and number of the components included in the CN 305 are not limited to the example shown in FIG. 3, and the CN 305 may further include at least one the same component (e.g., a UPF node) or at least one other component (e.g., a unified data management (UDM) node or a network function repository function (NRF) node) or may exclude at least one of the components.

According to an embodiment, the AMF node 312 and the SMF node 314 may perform the same function as a function of a mobile management entity (MME) in a 4G network or may perform at least a part of the function of the MME. For example, the AMF node 312 may manage information associated with access authentication for the CN 305 of the electronic device 101 and mobility of the electronic device 101. The SMF node 314 may generate a session for data transfer between the electronic device 101 and the DN 320 via the UPF node 310 and may control UPF re-location for changing a UPF node (e.g., a UPF node 310) connected with the electronic device 101.

According to an embodiment, the PCF node 316 may perform the same function as a function of a policy control resource function (PCRF) in the 4G network or may perform at least a part of the function of the PCRF. For example, the PCF node 316 may determine a policy associated with data transfer of the electronic device 101 based on information associated with quality of service (QoS) or billing information.

According to an embodiment, the UPF node 310 may perform a function of a packet data network gateway (P-GW) and a serving gateway (S-GW) in the 4G network. For example, the UPF node 310 may perform a routing function such that data may be transmitted and received between the electronic device 101 and the DN 320 on the user plane and may perform an anchor function of assigning an IP address corresponding to the DN 320.

According to an embodiment, an application function (AF) node 330 may provide information associated with QoS to the PCF node 316.

Figure 4:
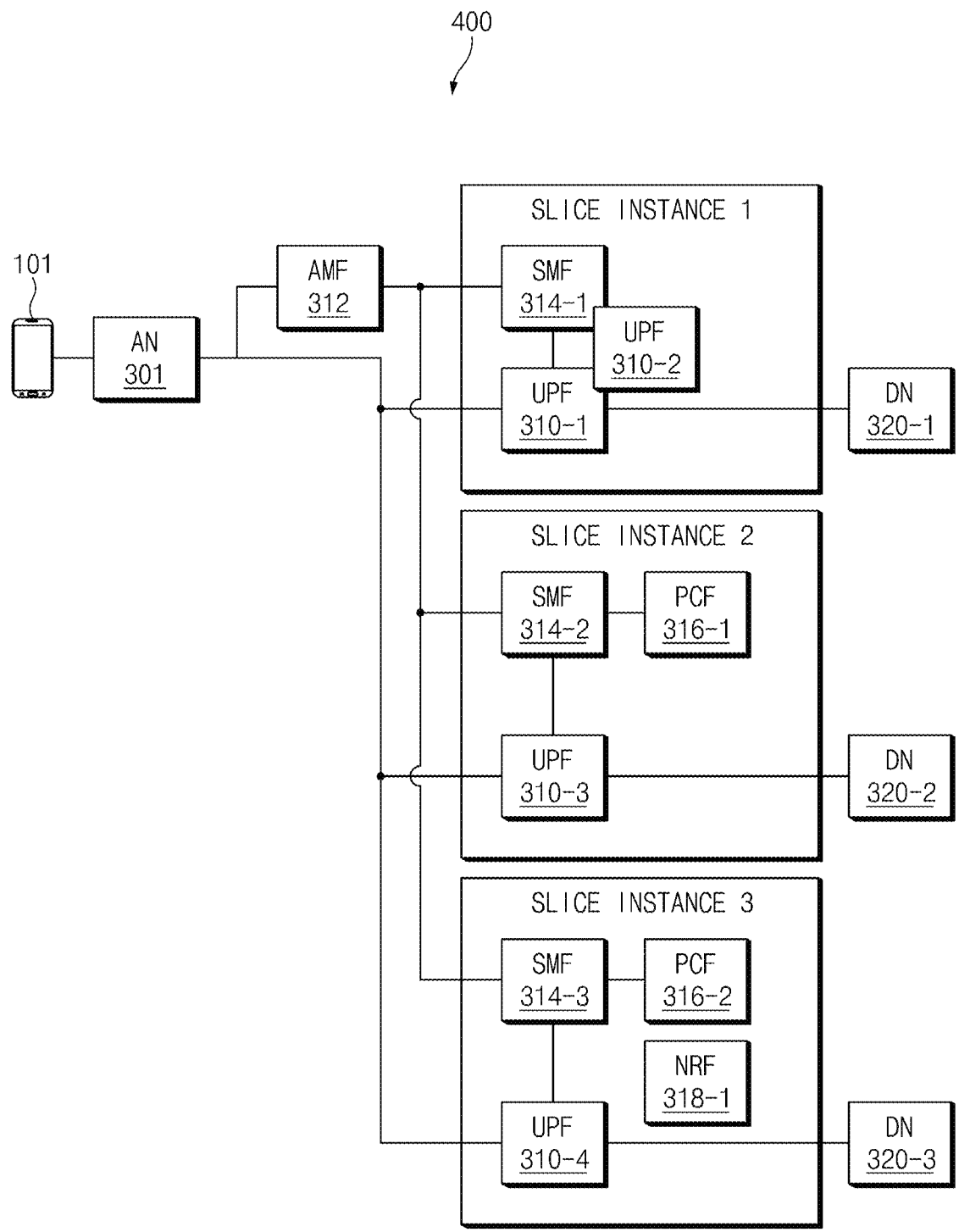
FIG. 4 illustrates a drawing of a network slice according to various embodiments.

FIG. 4 illustrates a drawing of a network slice according to various embodiments.

Referring to FIG. 4, in a network 400 (e.g., a network environment 300 of FIG. 3), an AMF node 312 may be connected to a plurality of network slices 1 to 3. In the present disclosure, the network slice may be referred to as a network slice instance or a slice instance. In FIG. 4, an embodiment is exemplified as the one AMF node 312 is connected to the AN 301. However, embodiments are not limited thereto. For example, a plurality of AMF nodes may be connected to the AN 301.

According to an embodiment, at least some of network slices 1 to 3 may include different components or a different number of components to provide different service types or different QoS. For example, network slice 1 connected to a DN 320-1 may include one SMF node (e.g., an SMF node 314-1) and a plurality of UPF nodes (e.g., UPF nodes 310-1 and 310-2). For another example, network slice 2 connected to a DN 320-2 may include on SMF node (e.g., an SMF node 314-2), one UPF node (e.g., a UPF node 310-3) and a PCF node (e.g., a PCF node 316-1) connected to the SMF node. For another example, network slice 3 connected to a DN 320-3 may include one SMF node (e.g., an SMF node 314-3), one UPF node (e.g., an UPF node 310-4), a PCF node (e.g., a PCF node 316-2) connected to the SMF node, and an NRF node (e.g., an NRF node 318-1).

The service type may include, for example, enhanced mobile broadband (eMBB), ultra-reliable and low latency communication (URLLC), or massive machine type communication (mMTC). The eMBB may refer to a network service, for example, a smartphone service, which requires a high data transfer rate and low latency. The URLLC may refer to a network service, for example, a disaster relief network or vehicle to everything (V2X) network, which requires low latency and high reliability. The mMTC may refer to a network service, for example, an Internet of things (IoT), which does not require low latency while a plurality of entities are connected to each other. The QoS may include QoS, for example, a minimum bandwidth, latency, or a maximum error rate for data transfer.

According to an embodiment, an electronic device 101 may establish a packet data unit (PDU) session over a network slice determined according to a requirement of a user or an application which is running on the electronic device 101.

Figure 5:
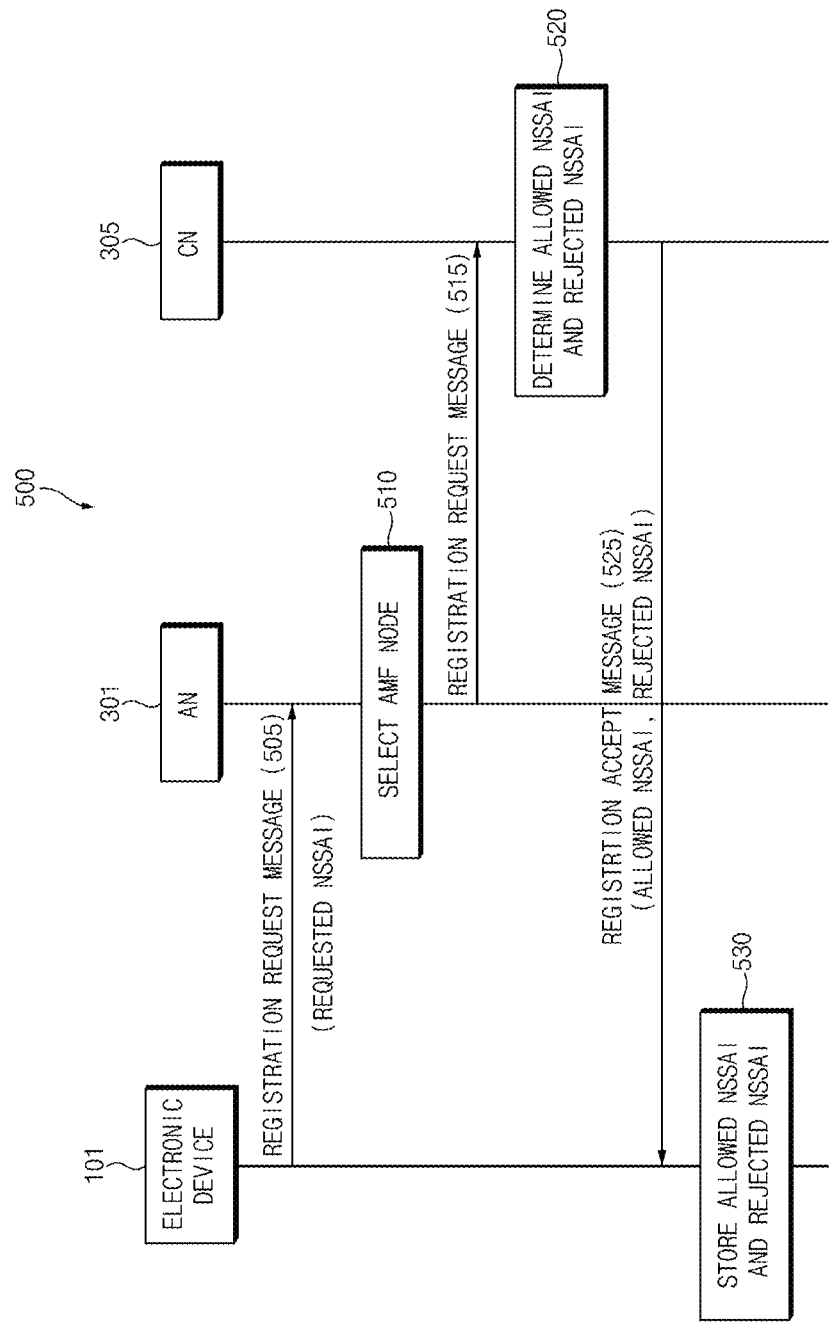
FIG. 5 illustrates a signal sequence diagram of transmitting information about a network slice according to various embodiments.

FIG. 5 illustrates a signal sequence diagram 400 of transmitting information about a network slice according to various embodiments.

Referring to FIG. 5, an electronic device 101 may share information (e.g., network slice selection assistance information (NSSAI)) about a network slice with a 5G network through a registration procedure and may establish a PDU session over a network slice determined based on the shared information. According to an embodiment, the registration procedure may include a procedure where the electronic device 101 is registered for the first time with the 5G network (e.g., a CN 305) and an update procedure performed periodically or aperiodically after the initial registration procedure.

According to an embodiment, in operation 505, the electronic device 101 may transmit a registration request message to an AN 301. According to an embodiment, the registration request message may include a requested NSSAI.

According to an embodiment, in operation 510, the AN 301 may select an AMF node (e.g., an AMF node 312 of FIG. 3) included in a CN 305 based at least on the requested NSSAI.

According to an embodiment, in operation 515, the AN 301 may forward the registration request message, received from the electronic device 101, to the CN 305. For example, the AN 301 may transmit the registration request message to the selected AMF node.

According to an embodiment, in operation 520, the CN 305 may determine an allowed NSSAI and a rejected NSSAI based on at least one of the requested NSSAI included in the registration request message, at least one s-NSSAI supportable by the AMF node selected by the AN 301, information (e.g., subscriber information) of the electronic device 101, which is stored in the CN 305, or location information (e.g., a registration area (RA)) of the electronic device 101.

According to an embodiment, in operation 525, the CN 305 may transmit a registration accept message including the allowed NSSAI and the rejected NSSAI to the electronic device 101 over the AN 301.

According to an embodiment, in operation 530, the electronic device 101 may store the allowed NSSAI and the rejected NSSAI included in the registration accept message in a memory (e.g., a memory 130 of FIG. 1). According to an embodiment, the electronic device 101 may establish a PDU session using at least one s-NSSAI included in an allowed NSSAI which is subsequently stored.

Embodiments described below describe an operation of the electronic device 101 which transmits a requested NSSAI. According to various embodiments, the electronic device 101 may determine a requested NSSAI using an application NSSAI (app NSSAI), other than a configured NSSAI, a requested NSSAI, an allowed NSSAI, and a rejected NSSAI, which are defined in the standard specification.

Furthermore, according to various embodiments, the electronic device 101 may determine a requested NSSAI in the registration procedure shown in FIG. 5. For example, the electronic device 101 may determine a requested NSSAI in a registration procedure subsequent to an initial registration procedure as well as the initial registration procedure.

Furthermore, according to various embodiments, the electronic device 101 may generate a requested NSSAI field capable of indicating priorities of s-NSSAIs.

1. A Type of NSSAI According to Various Embodiments (1) Configured NSSAI

According to an embodiment, the configured NSSAI may be stored in the memory (e.g., the memory 130 of FIG. 1) or a subscriber identification module (e.g., a subscriber identification module 196 of FIG. 1) of the electronic device 101 before an initial registration procedure. According to an embodiment, the configured NSSAI may be designated by a network (e.g., a network operator).

According to an embodiment, the configured NSSAI may indicate s-NSSAIs according to a specified priority by the network operator. For example, the configured NSSAI may indicate s-NSSAIs, each of which has a high priority, on an upper end (or a front end) of a configured NSSAI field. According to another embodiment, the configured NSSAI may indicate e-NSSAIs in any order.

According to an embodiment, at least one of configurations of the s-NSSAIs included in the configured NSSAI or priorities of the s-NSSAIs may be changed by an update procedure (e.g., a configured update procedure). When there is at least one new s-NSSAI in the configured NSSAI by the update procedure, the electronic device 101 may set a priority of the at least one new s-NSSAI to be higher than priorities of existing s-NSSAIs.

(2) Allowed NSSAI and Rejected NSSAI

Figure 6:
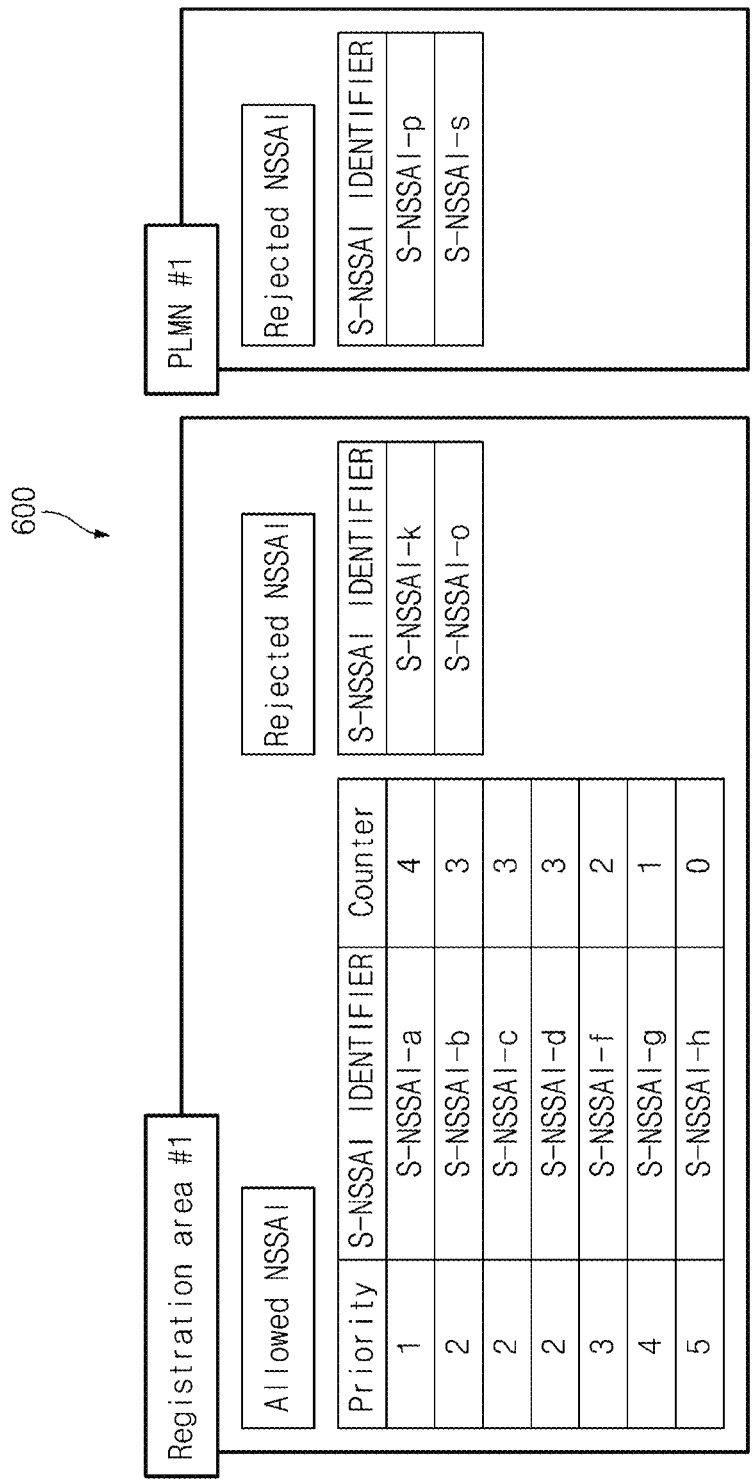
FIG. 6 illustrates a drawing of a configuration of an allowed NSSAI and a rejected NSSAI according to various embodiments.

FIG. 6 illustrates a table 600 indicating an allowed NSSAI and a rejected NSSAI stored in an electronic device 101 according to various embodiments.

Referring to FIG. 6, the electronic device 101 may receive an allowed NSSAI and a rejected NSSAI through a registration accept message (e.g., operation 530 of FIG. 5). Because the allowed NSSAI is received in a registration procedure (e.g., an initial registration procedure or a registration update procedure), the electronic device 101 may store and manage the allowed NSSAI and the rejected NSSAI depending on a format of the table 600. For example, the electronic device 101 may store s-NSSAIs included in the allowed NSSAI for each RA. For another example, the electronic device 101 may store s-NSSAIs included in the rejected NSSAI for each RA or PLMN.

According to an embodiment, to increase the number of s-NSSAIs allowed from a network or enhance a probability that an s-NSSAI the electronic device 101 wants (e.g., an s-NSSAI included in an application NSSAI) will be allowed, the electronic device 101 may determine a priority of at least one s-NSSAI included in an allowed NSSAI received from the network.

For example, the electronic device 101 may set a counter of each of the s-NSSAIs included in the allowed NSSAI received from the network. Whenever the s-NSSAI is allowed from the network, the counter may increase. For example, when the s-NSSAI-a is allowed four times from the network, the counter may be 4. When the counter of each of the other s-NSSAIs is less than 4, the s-NSSAI-a may have the highest priority. According to another embodiment, the electronic device 101 may determine priorities of the s-NSSAIs included in the allowed NSSAI received from the network depending on a service type.

For example, when a slice service type (SST) of the s-NSSAI-a is eMBB and when an SST of the s-NSSAI-b is URLLC, the electronic device 101 may set a priority of the eMBB to be high according to at least one of a type of the electronic device 101 or a pattern of a user. When the type of the electronic device 101 is a smartphone or when the user is a user who frequently uses a high-capacity service (e.g., an age group which frequently uses the high-capacity service), the electronic device 101 may set the eMBB as an SST with a high priority and may set the s-NSSAI-a to have the highest priority.

Hereinafter, in various embodiments of the present disclosure, an allowed NSSAI and a rejected NSSAI received through an Nth (N is a natural number) registration procedure may be referred to as an Nth allowed NSSAI and an Nth rejected NSSAI, respectively. For example, an allowed NSSA and a rejected NSSAI received through an initial registration procedure may be referred to as a first allowed NSSAI and a first rejected NSSAI, respectively, and an allowed NSSAI and a rejected NSSAI received in a registration procedure subsequent to the initial registration procedure may be referred to as a second allowed NSSAI and a second rejected NSSAI, respectively.

Furthermore, in various embodiments of the prevent disclosure, an allowed NSSAI and a rejected NSSAI received through a last (or final) registration procedure may be referred to as a last allowed NSSAI and a last rejected NSSAI, respectively.

(3) Application NSSAI

The application NSSAI may include at least one s-NSSAI which is available for each application. According to an embodiment, an electronic device (e.g., an electronic device 101 of FIG. 1) may determine an application NSSAI based on configuration information of an application. The configuration information of the application may include configuration information included in an installation package of the application and configuration information associated with the installed application. According to an embodiment, the configuration information may include at least one of, for example, an application identifier (e.g., an application name or ID) or a service type, QoS, or a data network name (DNN) required to run the application. The electronic device 101 may determine at least one s-NSSAI mapped to the application depending on the configuration information. For another example, the configuration information of the application may explicitly indicate the s-NSSAI mapped to the application.

According to an embodiment, the electronic device 101 may manage the application NSSAI through a layer. For example, the electronic device 101 may determine, store, update, and delete the application NSSAI through a layer disposed at a lower end of an application layer (e.g., an application 146 of FIG. 1). For example, the electronic device 101 may determine an application NSSAI, when the application is install in the electronic device 101, and may store the determined NSSAI in a memory (e.g., a memory 130 of FIG. 1). For another example, the electronic device 101 may determine an application NSSAI, when the installed application is run on the electronic device 101. According to an embodiment, a layer which manages the application NSSAI may be included in at least one of middleware 144 or an operating system 142 of FIG. 1 or may be a separate layer.

According to an embodiment, the electronic device 101 may determine priorities of a plurality of s-NSSAIs included in the application NSSAI. For example, the electronic device 101 may determine a priority depending on at least one of a service type of the application or a type of the application (e.g., a telephony application, a messenger application, a background application, or a $3^{rd}$ party application). For another example, the electronic device 101 may determine a priority depending on a service type of the electronic device 101 (or the application), set by a user setting. For another example, the electronic device 101 may determine a priority using a counter. A counter of an s-NSSAI corresponding to the application may be set to 0 when the application is installed in the electronic device 101, and the counter of the s-NSSAI corresponding to the application may increase whenever the application is run. The more the counter of the s-NSSAI increase, the more the priority may increase.

According to an embodiment, the electronic device 101 may store and manage information (e.g., priorities, counters, or identifiers) about the s-NSSAIs included in the application NSSAI. For example, the application NSSAI may indicate an identifier, a counter, and a priority of an s-NSSAI depending on a format, for example, Table 1 below.

TABLE 1

| Priority | ID | s-NSSAI | Counter |
|----------|-------|----------|---------|
| 1 | App 1 | s-NSSAI-a | 3 |
|   | App 2 |           |   |
| 2 | App 3 | s-NSSAI-b | 1 |

According to an embodiment, the information about the s-NSSAIs included in the application NSSAI may be changed whenever a user equipment route selection policy (URSP) update procedure is performed.

According to an embodiment, the electronic device 101 may determine at least one of s-NSSAIs included in a configured NSSAI as a requested NSSAI using the application NSSAI. The method for determining the request NSSAI may include a method for i) determining a maximum number of s-NSSAIs (e.g., 8 s-NSSAIs) as a requested NSSAI or ii) determining a minimum number of s-NSSAIs as a requested NSSAI.

2. Method for Determining a Requested NSSAI (1) Embodiment for Determining a Maximum Number of s-NSSAIs According to an embodiment, the electronic device 101 may determine the number of s-NSSAIs included in a requested NSSAI as a maximum number (e.g., 8) according to the standard specification to enhance a probability that as many s-NSSAIs as possible will be allowed from a network.

Figure 7:
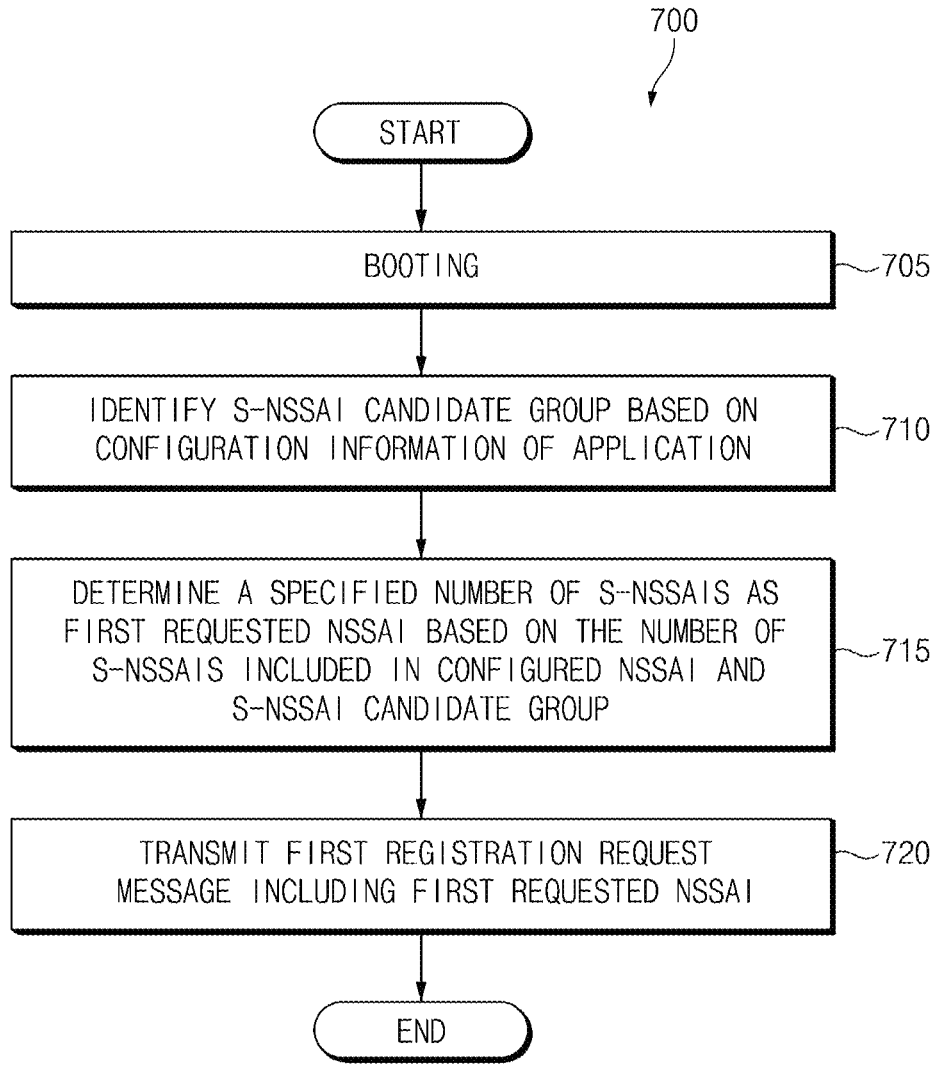
FIG. 7 illustrates an operational flowchart of an electronic device for determining a specified number of s-NSSAIs as a first requested NSSAI according to various embodiments.

FIG. 7 illustrates an operational flowchart 700 of an electronic device 101 for determining a specified number of s-NSSAIs (e.g., 8 s-NSSAIs) as a first requested NSSAI according to various embodiments. FIG. 7 illustrates an embodiment for determining a first requested NSSAI in an initial registration procedure. Operations included in the operational flowchart 700 described below and another operational flowchart may be performed by an electronic device 101 or may be performed by a component (e.g., a processor 120 of FIG. 1) of the electronic device 101.

Referring to FIG. 7, according to various embodiments, in operation 705, the electronic device 101 may be booted. According to an embodiment, before the electronic device 101 is booted, a configured NSSAI may be stored in a memory (e.g., a memory 130 of FIG. 1) or a subscriber identification module (e.g., a subscriber identification module 196 of FIG. 1) of the electronic device 101.

According to various embodiments, in operation 710, the electronic device 101 may identify an s-NSSAI candidate group to be included in a requested NSSAI, based on configuration information of an application. At least one s-NSSAI included in the s-NSSAI candidate group may include at least one s-NSSAI included in an application NSSAI. For example, the electronic device 101 may determine the application NSSAI based on the configuration information of the application and may identify the at least one s-NSSAI included in the application NSSAI as the s-NSSAI candidate group. For example, the electronic device 101 may identify an s-NSSAI candidate group based on an identifier of the application (e.g., an application ID). For another example, the electronic device 101 may identify an s-NSSAI candidate group based on a service type required to run the application. According to an embodiment, the electronic device 101 may determine a priority of the at least one s-NSSAI included in the s-NSSAI candidate group based on priorities of the s-NSSAIs included in the application NSSAI. According to another embodiment, the electronic device 101 may determine priorities of s-NSSAIs included in the s-NSSAI candidate group based on at least one of a service type of the application, a type of the application, a user setting, or a counter. For example, when there are no priorities of the s-NSSAIs included in the application NSSAI, the electronic device 101 may determine the priorities of the s-NSSAIs included in the s-NSSAI candidate group based on at least one of a service type of the application, a type of the application, a user setting, or a counter.

According to an embodiment, in operation 715, the electronic device 101 may determine a specified number of s-NSSAIs (e.g., 8 s-NSSAIs) as a first requested NSSAI based on the number of s-NSSAIs included in the configured NSSAI and the s-NSSAI candidate group.

For example, when the number of the s-NSSAIs included in the configured NSSAI is 0, the electronic device 101 may generate information (e.g., "null") indicating that there is no first requested NSSAI or may determine an s-NSSAI candidate group determined by a user setting as a first requested NSSAI.

For another example, the number of the s-NSSAIs included in the configured NSSAI is greater than 0 and is less than a specified number (e.g., 8), the electronic device 101 may determine all the s-NSSAIs included in the configured NSSAI as a first requested NSSAI. In this case, when there is a priority of an s-NSSAI candidate group (or the at least one s-NSSAI included in the application NSSAI), the electronic device 101 may set priorities of s-NSSAIs included in a requested NSSAI depending on the priority of the s-NSSAI candidate group.

For example, when the s-NSSAI-a and the s-NSSAI-b are included in the application NSSAI and when the priority of the s-NSSAI-a is 1 and the priority of the s-NSSAI-b is 2, and when both the s-NSSAI-a and the s-NSSAI-b are included in the requested NSSAI, the electronic device 101 may set the s-NSSAI-a to a first priority and may set the s-NSSSAI-b to a second priority.

For another example, when the number of the s-NSSAIs included in the configured NSSAI is greater than or equal to the specified number (e.g., 8), the electronic device 101 may determine a specified number of s-NSSAIs among the s-NSSAIs included in the configured NSSAI as a first requested NSSAI, depending on the priority of the s-NSSAI candidate group or depending on priorities of the s-NSSAIs included in the configured NSSAI.

According to an embodiment, in operation 720, the electronic device 101 may transmit a first registration request message including the first requested NSSAI (e.g., operation 505 of FIG. 5). According to an embodiment, the electronic device 101 may generate a first requested NSSAI field such that the first requested NSSAI indicates the s-NSSAIs depending on the priorities of the s-NSSAIs. A description will be given below of an embodiment of a format of the requested NSSAI field with reference to FIGS. 14 and 15.

Figure 8:
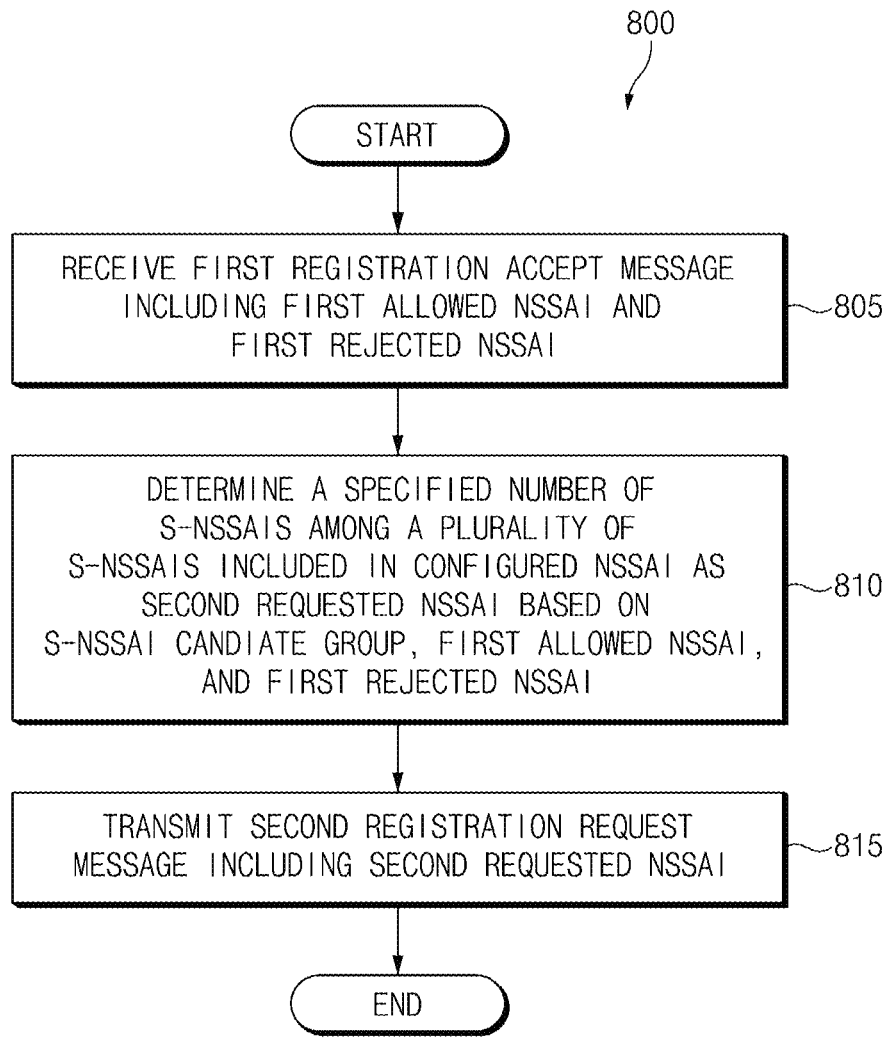
FIG. 8 illustrates an operational flowchart of an electronic device for determining a specified number of s-NSSAIs as a second requested NSSAI according to various embodiments.
Figure 9:
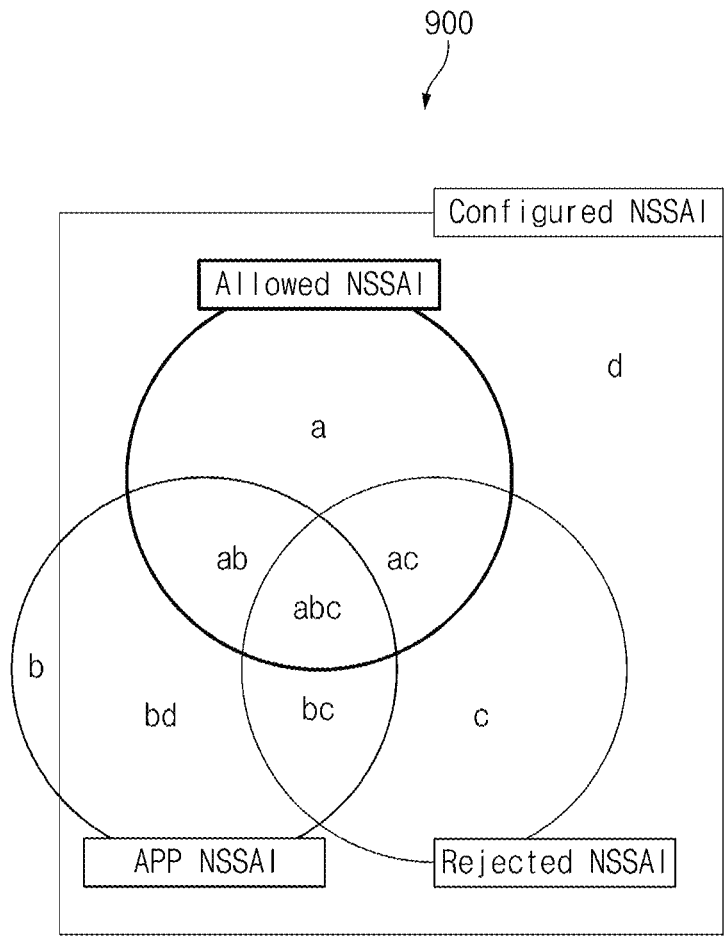
FIG. 9 illustrates a diagram for determining a second requested NSSAI according to various embodiments.

FIGS. 8 and 9 illustrate an embodiment of an electronic device 101 for determining a specified number of s-NSSAIs (e.g., 8 s-NSSAIs) as a second requested NSSAI according to various embodiments.

FIG. 8 illustrates an operational flowchart 800 of an electronic device 101 for determining a second requested NSSAI.

FIG. 9 illustrates a diagram 900 for determining a second requested NSSAI.

According to an embodiment, operations included in the operational flowchart 800 of FIG. 8 may be performed after operation 720 of FIG. 7 is performed.

Referring to FIG. 8, according to an embodiment, in operation 805, the electronic device 101 may receive a first registration accept message including a first allowed NSSAI and a first rejected NSSAI (e.g., operation 530 of FIG. 5). The electronic device 101 may store the first allowed NSSAI and the first rejected NSSAI in a memory (e.g., a first memory 130 of FIG. 1) of the electronic device 101. For example, the first allowed NSSAI and the first rejected NSSAI may be stored for each RA or PLMN.

According to an embodiment, in operation 810, the electronic device 101 may determine a specified number of s-NSSAIs among a plurality of s-NSSAIs included in a configured NSSAI as a second requested NSSAI based on an s-NSSAI candidate group, the first allowed NSSAI, and the first rejected NSSAI. According to an embodiment, when the number of the s-NSSAIs is greater than a specified number, the electronic device 101 may select a specified number of s-NSSAIs based on a priority. When the number of the s-NSSAIs is less than or equal to the specified number, the electronic device 101 may additionally select an s-NSSAI which satisfies a specified condition among s-NSSAIs which are not selected.

For example, referring to FIG. 9, when the number of s-NSSAIs which are included in a first allowed NSSAI and an application NSSAI and is not included in a first rejected NSSAI (e.g., the number of s-NSSAIs which belong to group ab) among s-NSSAIs included in a configured NSSAI is a specified number (e.g., 8), the electronic device 101 may determine at least one s-NSSAI which belongs to group ab as a second requested NSSAI.

According to an embodiment, when the number of s-NSSAIs which belong to group ab is less than the specified number, the electronic device 101 may additionally determine at least one s-NSSAI, which does not belong to group ab and is not included in the first rejected NSSAI (e.g., at least one s-NSSAI which belongs to group a) among s-NSSAIs included in the first allowed NSSAI, as a second requested NSSAI. When the number of the s-NSSAIs which belong to group ab is greater than the specified number, the electronic device 101 may determine a specified number of s-NSSAIs among the s-NSSAIs which belong to group ab as a second requested NSSAI depending on priorities of the s-NSSAIs included in the first allowed NSSAI.

According to an embodiment, when the number of s-NSSAIs which belong to group ab+a is less than or equal to the specified number, the electronic device 101 may additionally determine at least one s-NSSAI, which does not belong to group ab and is not included in the first rejected NSSAI (e.g., at least one s-NSSAI which belongs to group bd) among s-NSSAIs included in the application NSSAI, as a second requested NSSAI. When the number of the s-NSSAIs which belong to group ab+a is greater than the specified number, the electronic device 101 may determine a specified number of s-NSSAIs among the s-NSSAIs which belong to group ab+a as a second requested NSSAI depending on at least one of priorities of the s-NSSAI included in the first allowed NSSAI or priorities of the s-NSSAI included in the application NSSAI.

According to an embodiment, when the number of s-NSSAIs which belong to group ab+a+bd is less than or equal to the specified number, the electronic device 101 may additionally determine at least one s-NSSAI, which is not included in the application NSSAI, the first allowed NSSAI, and the first rejected NSSAI (e.g., at least one s-NSSAI which belongs to group d) among s-NSSAIs included in the configured NSSAI, as a second requested NSSAI. When the number of s-NSSAIs which belong to group ab+a+bd is greater than the specified number, the electronic device 101 may determine a specified number of s-NSSAIs among the s-NSSAIs which belong to group ab+a+bd as a second requested NSSAI depending on at least one of the priorities of the s-NSSAIs included in the first allowed NSSAI or the priorities of the s-NSSAIs included in the application NSSAI.

According to an embodiment, when the number of s-NSSAIs which belong to group ab+a+bd+d is greater than the specified number, the electronic device 101 may determine a specified number of s-NSSAIs among the s-NSSAIs which belong to group ab+a+bd+d as a second requested NSSAI depending on priorities of the s-NSSAIs included in the configured NSSAI.

According to an embodiment, in operation 815, the electronic device 101 may transmit a second registration request message including the second requested NSSAI. According to an embodiment, the electronic device 101 may generate a second requested NSSAI such that the second requested NSSAI indicates the s-NSSAIs depending on the priorities of the s-NSSAIs.

Figure 10:
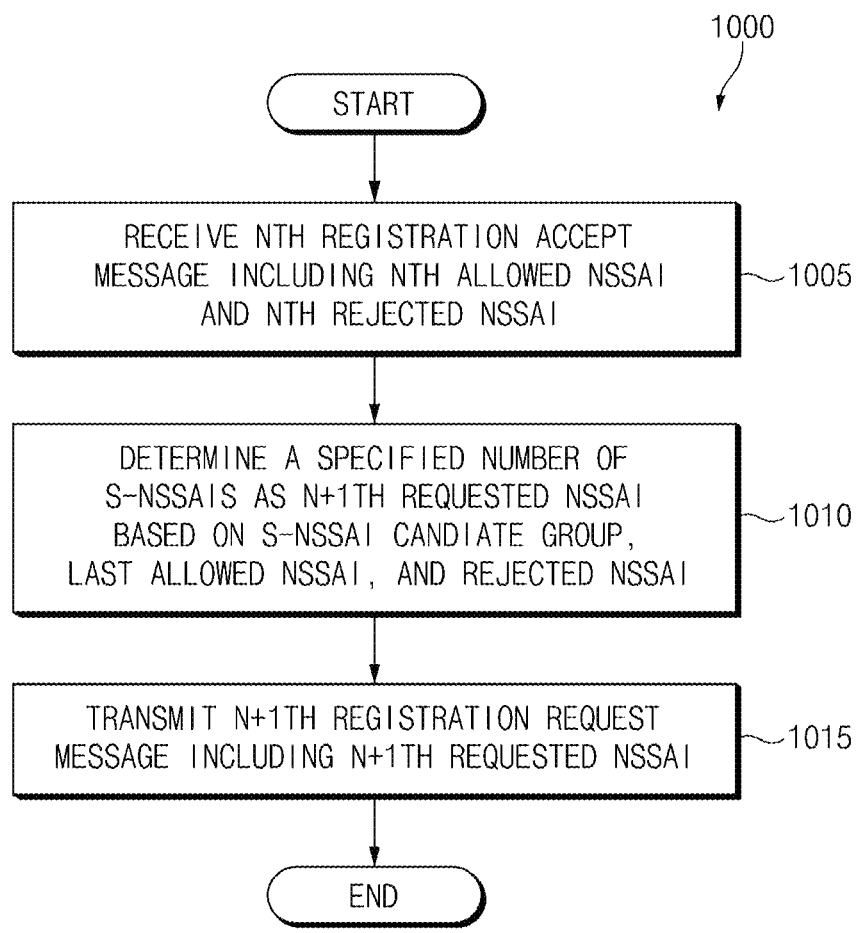
FIG. 10 illustrates an operational flowchart of an electronic device for determining a specified number of s-NSSAIs as an N+1th requested NSSAI according to various embodiments.
Figure 11:
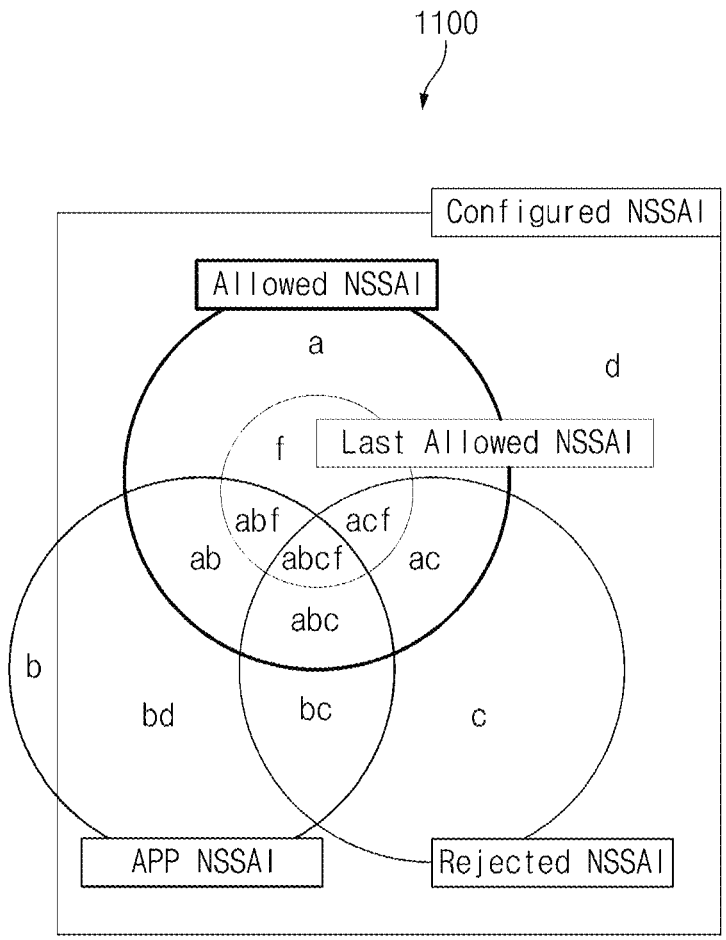
FIG. 11 illustrates a diagram for determining an N+1th requested NSSAI according to various embodiments.

FIGS. 10 and 11 illustrate an embodiment of an electronic device 101 for determining a specified number of s-NSSAIs (e.g., 8 s-NSSAIs) as an N+1th requested NSSAI according to various embodiments.

FIG. 10 illustrates an operation flowchart 1000 of an electronic device 101 for determining an N+1th requested NSSAI.

FIG. 11 illustrates a diagram 1100 for determining an N+1th requested NSSAI.

According to an embodiment, the electronic device 101 may transmit a registration request message a plurality of times and may receive a registration accept message a plurality of times. For example, referring to FIG. 10, after operation 815 of FIG. 8 is performed, in operation 1005, the electronic device 101 may receive an Nth registration accept message including an Nth allowed NSSAI and an Nth rejected NSSAI. N may be a natural number of greater than or equal to 2. The electronic device 101 may store the Nth allowed NSSAI and the Nth rejected NSSAI in a memory (e.g., a memory 130 of FIG. 1) of the electronic device 101.

According to an embodiment, the electronic device 101 may change priorities of s-NSSAIs included in a previously stored NSSAI (e.g., a first allowed NSSAI) based on the Nth allowed NSSAI. For example, referring to FIG. 6, when the registration accept message received in operation 1005 is a second registration accept message and when the s-NSSAI-c is included in a second allowed NSSAI, a counter of the s-NSSAI-c may become 4. In this case, the priority of the s-NSSAI-c may become a second priority.

According to an embodiment, the electronic device 101 may set a priority of the Nth allowed NSSAI to be higher than a priority of the first allowed NSSAI. For example, referring to FIG. 6, when the s-NSSAI-c is included in the second allowed NSSAI, the priority of the s-NSSAI-c may be higher than a priority of the s-NSSAI-a.

According to an embodiment, in operation 1010, the electronic device 101 may determine a specified number of s-NSSAIs among a plurality of s-NSSAIs included in a configured NSSAI as an N+1th requested NSSAI based on an s-NSSAI candidate group, a last allowed NSSAI, and a rejected NSSAI. The rejected NSSAI may include, for example, only a first rejected NSSAI or may include the first to Nth rejected NSSAIs.

For example, referring to FIG. 11, in the diagram 1000, an allowed NSSAI may include first to N−1th allowed NSSAIs, a last allowed NSSAI may include an Nth allowed NSSAI, and a rejected NSSAI may include first to Nth rejected NSSAIs.

According to an embodiment, when the number of s-NSSAIs which are included in the last allowed NSSAI and an application NSSAI and are not included in the rejected NSSAI (e.g., the number of s-NSSAIs which belong to group abf) among s-NSSAIs included in a configured NSSAI is a specified number (e.g., 8), the electronic device 101 may determine s-NSSAIs which belong to group abf as an N+1th requested NSSAI.

According to an embodiment, when the number of the s-NSSAIs which belong to group abf is less than the specified number, the electronic device 101 may additionally determine at least one s-NSSAI, which does not belong to group abf and is not included in the rejected NSSAI (e.g., at least one s-NSSAI which belongs to group f) among s-NSSAIs included in the last allowed NSSAI, as an N+1th requested NSSAI. When the number of the s-NSSAIs which belong to group abf is greater than the specified number, the electronic device 101 may determine a specified number of s-NSSAIs as an N+1th requested NSSAI depending on at least one of priorities of s-NSSAIs included in the last allowed NSSAI or priorities of s-NSSAIs included in the application NSSAI.

According to an embodiment, when the number of s-NSSAIs which belong to group abf+f is less than or equal to the specified number, the electronic device 101 may additionally determine at least one s-NSSAI, which is included in the allowed NSSAI and the application NSSAI and does not belong to group abf+f and is not included in the rejected NSSAI (e.g., at least one s-NSSAI which belongs to group ab), as an N+1th requested NSSAI. When the number of the s-NSSAIs which belongs to group abf+f is greater than the specified number, the electronic device 101 may determine a specified number of s-NSSAIs as an N+1th requested NSSAI depending on at least one of the priorities of the s-NSSAIs included in the last allowed NSSAI or the priorities of the s-NSSAIs included in the application NSSAI.

According to an embodiment, when the number of s-NSSAIs which belong to group abf+f+ab is less than or equal to the specified number, the electronic device 101 may additionally determine at least one s-NSSAI, which is included in the allowed NSSAI and does not belong to group abf+f+ab and is not included in the rejected NSSAI (e.g., at least one s-NSSAI which belongs to group a), as an N+1th requested NSSAI. When the number of s-NSSAIs which belong to group abf+f+ab is greater than the specified number, the electronic device 101 may determine a specified number of s-NSSAIs as an N+1th requested NSSAI depending on at least one of the priorities of the s-NSSAIs included in the last allowed NSSAI, priorities of the s-NSSAIs included in the allowed NSSAI, or the priorities of the s-NSSAIs included in the application NSSAI.

According to an embodiment, when the number of s-NSSAIs which belong to group abf+f+ab+a is less than or equal to the specified number, the electronic device 101 may determine at least one s-NSSAI, which is included in the application NSSAI and the configured NSSAI and does not belong to group abf+f+ab+a and is not included in the rejected NSSAI (e.g., at least one s-NSSAI which belongs to group bd), as an N+1th requested NSSAI. When the number of s-NSSAIs which belong to group abf+f+ab+a is greater than the specified number, the electronic device 101 may determine a specified number of s-NSSAIs as an N+1th requested NSSAI depending on at least one of the priorities of the s-NSSAIs included in the last allowed NSSAI, the priorities of the s-NSSAIs included in the allowed NSSAI, or the priorities of the s-NSSAIs included in the application NSSAI.

According to an embodiment, when the number of s-NSSAIs which belong to group abf+f+ab+a+bd is less than or equal to the specified number, the electronic device 101 may additionally determine at least one s-NSSAI, which is included in the configured NSSAI and does not belong to group abf+f+ab+a+bd and is not included in the rejected NSSAI (e.g., at least one s-NSSAI which belongs to group d), as an N+1th requested NSSAI. When the number of s-NSSAIs which belong to group abf+f+ab+a+bd is greater than the specified number, the electronic device 101 may determine a specified number of s-NSSAIs as an N+1th requested NSSAI depending on at least one of the priorities of the s-NSSAIs included in the last allowed NSSAI, the priorities of the s-NSSAIs included in the allowed NSSAI, or the priorities of the s-NSSAIs included in the application NSSAI.

According to an embodiment, when the number of s-NS-SAIs which belong to group abf+f+ab+a+bd+d is greater than the specified number, the electronic device 101 may determine a specified number of s-NSSAIs as an N+1th requested NSSAI depending on the priorities of the s-NS-SAIs included in the configured NSSAI.

For example, as shown in Tables 2 and 3 below, information (e.g., at least one of identifiers, priorities, or counters) about s-NSSAIs included in a configured NSSAI, a last allowed NSSAI, a rejected NSSAI, and an application NSSAI may be stored in a memory (e.g., a memory 130 of FIG. 1) of the electronic device 101.

TABLE 2

| | |
|---|---|
| Configured NSSAI | A, B, C, D, E, F, G, H, I, J, K, L, M, N, O, P (16개) |
| Last Allowed NSSAI | A, C, D, G, |
| Rejected NSSAI | K |
| APP NSSAI | A, C, J, M, N, S |

TABLE 3

| Allowed NSSAI | Counter |
|---|---|
| C | 4 |
| F | 3 |
| L | 3 |
| G | 2 |
| A | 2 |
| O | 1 |
| D | 1 |

In Tables 2 and 3, uppercase alphabetic characters may denote s-NSSAIs, respectively. According to the above-mentioned method, the electronic device 101 may select A and C included in the last allowed NSSAI and the application NSSAI in the configured NSSAI. When the number of the selected s-NSSAIs is less than 8, the electronic device 101 may additionally select D and G included in the last allowed NSSAI. Subsequently, the electronic device 101 may select F, L, and O included in the allowed NSSAI and may finally select J, M, and N included in the application NSSAI and the configured NSSAI. Because the number of the s-NSSAIs including J, M, and N is greater than 8, the electronic device 101 may select one s-NSSAI based on priorities of J, M, and N.

The embodiment in which the s-NSSAIs included in the allowed NSSAI (or the last allowed NSSAI) are selected earlier than the s-NSSAIs included in the application NSSAI is described with reference FIG. 11 and Tables 2 and 3. However, according to another embodiment, the electronic device 101 may select the s-NSSAIs included in the application NSSAI earlier than the s-NSSAIs included in the allowed NSSAI depending on an operator policy (or a user setting). For example, in Tables 2 and 3, the electronic device 101 may first select A and C and may then select J, M, and N included in the application NSSAI and the configured NSSAI.

According to an embodiment, in operation 1015, the electronic device 101 may transmit an N+1th registration request message including the N+1th requested NSSAI. According to an embodiment, the electronic device 101 may generate an N+1th requested NSSAI field such that the N+1th NSSAI indicates the s-NSSAIs depending on priorities of s-NSSAIs.

(2) Embodiment for Determining a Minimum Number of s-NSSAIs

According to an embodiment, the electronic device 101 may perform minimization of the number of the s-NSSAIs included in the requested NSSAI. When the number of the s-NSSAIs is minimized, in operation 510 of FIG. 5, a base station (e.g., an AN 301 of FIG. 2) may fail to select an AMF node (e.g., an AMF node 312 of FIG. 3) which is not required by the electronic device 101. The 'minimization' described in the present disclosure may refer to an operation where the electronic device 101 does not select an additional s-NSSAI, when an s-NSSAI is determined according to a method described below.

Figure 12:
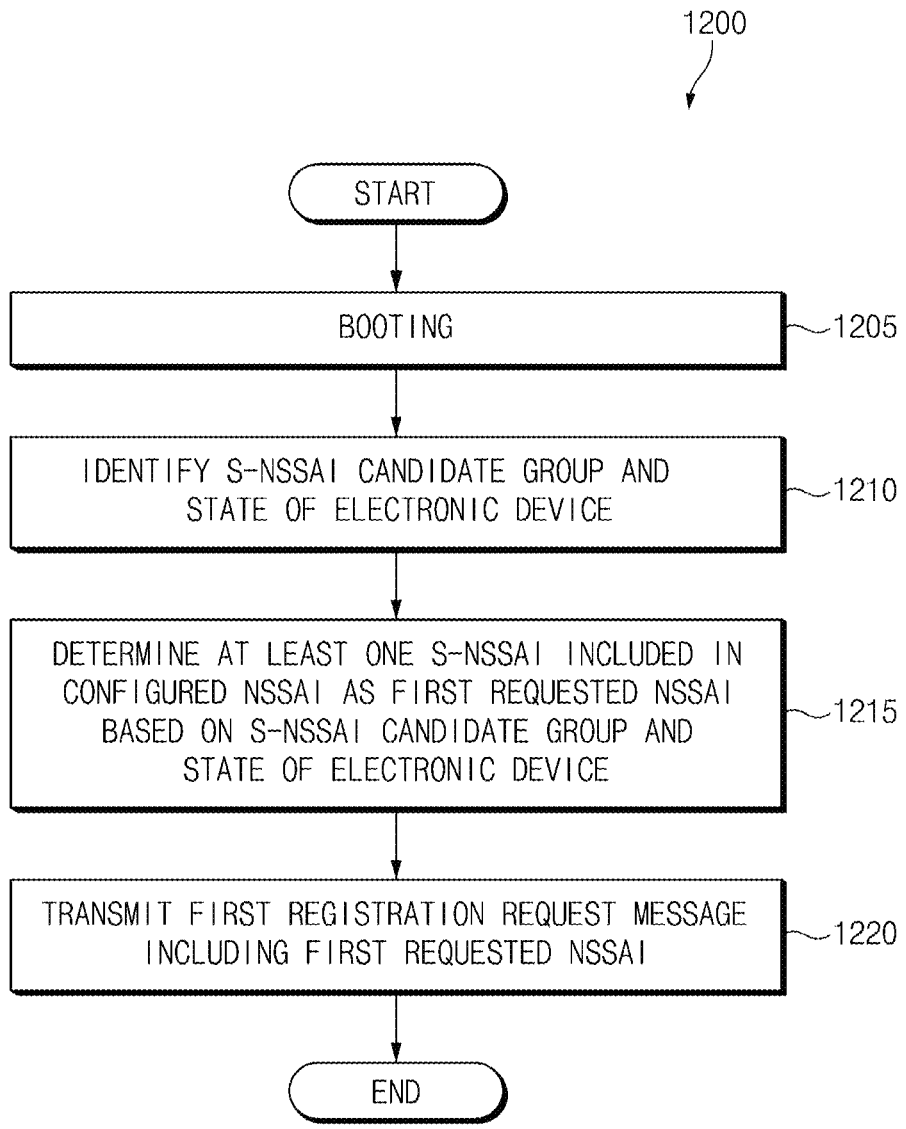
FIG. 12 illustrates an operational flowchart of an electronic device for determining at least one s-NSSAI as a first requested NSSAI according to various embodiments.

FIG. 12 illustrates an operational flowchart 1200 of an electronic device 101 for determining at least one s-NSSAI as a first requested NSSAI according to various embodiments. FIG. 12 illustrates an embodiment for determining a first requested NSSAI in an initial registration procedure.

Referring to FIG. 12, according to an embodiment, in operation 1205, the electronic device 101 may be booted. According to an embodiment, a configured NSSAI may be stored in a memory (e.g., a memory 130 of FIG. 1) or a subscriber identification module (e.g., a subscriber identification module 196 of FIG. 1) of the electronic device 101 before the electronic device 101 is booted.

According to an embodiment, in operation 1210, the electronic device 101 may identify an s-NSSAI candidate group and a state of the electronic device 101. According to an embodiment, the state of the electronic device 101 may include at least one of an operation mode of the electronic device 101 or a service mode of the electronic device 101. The service mode may include a service type (e.g., at least one of eMBB, URLLC, or mMTC) required (or supportable) by an application which is run on the electronic device 101.

The operation mode may include at least one of, for example, a power save mode, a game mode, a data save mode, a high-performance mode, or an auto mode. In the power save mode, the electronic device 101 may determine only an s-NSSAI, defined by an IMS (e.g., a call) and a packet data network (PND) (e.g., an IMS PDN or a low latency PDN) for a messenger application, as a requested NSSAI to reduce power consumption. In the game mode, the electronic device 101 may determine an s-NSSAI, defined by a PDN for a game application (e.g., an s-NSSAI where the service type is eMBB or URLLC), as a requested NSSAI. In the data save mode, the electronic device 101 may determine only an s-NSSAI, defined by a PDN for a messenger application, as a requested NSSAI, except for an s-NSSAI where the service type is eMBB. In the high-performance mode, the electronic device 101 may determine an s-NSSAI, where the service type is eMBB, as a requested NSSAI. In the auto mode, the electronic device 101 may determine an s-NSSAI, having a slice differentiator (SD) defined for a vehicle, in which the service type is URLLC, as a requested NSSAI.

According to an embodiment, in operation 1215, the electronic device 101 may determine at least one of a plurality of s-NSSAIs included in the configured NSSAI as a first requested NSSAI based on the s-NSSAI candidate group and the state of the electronic device 101. The electronic device 101 may determine at least one s-NSSAI, corresponding to the state of the electronic device 101 among s-NSSAIs included in the configured NSSAI and an application NSSAI, as a first requested NSSAI.

According to an embodiment, in operation 1220, the electronic device 101 may transmit a first registration request message including the first requested NSSAI.

Figure 13:
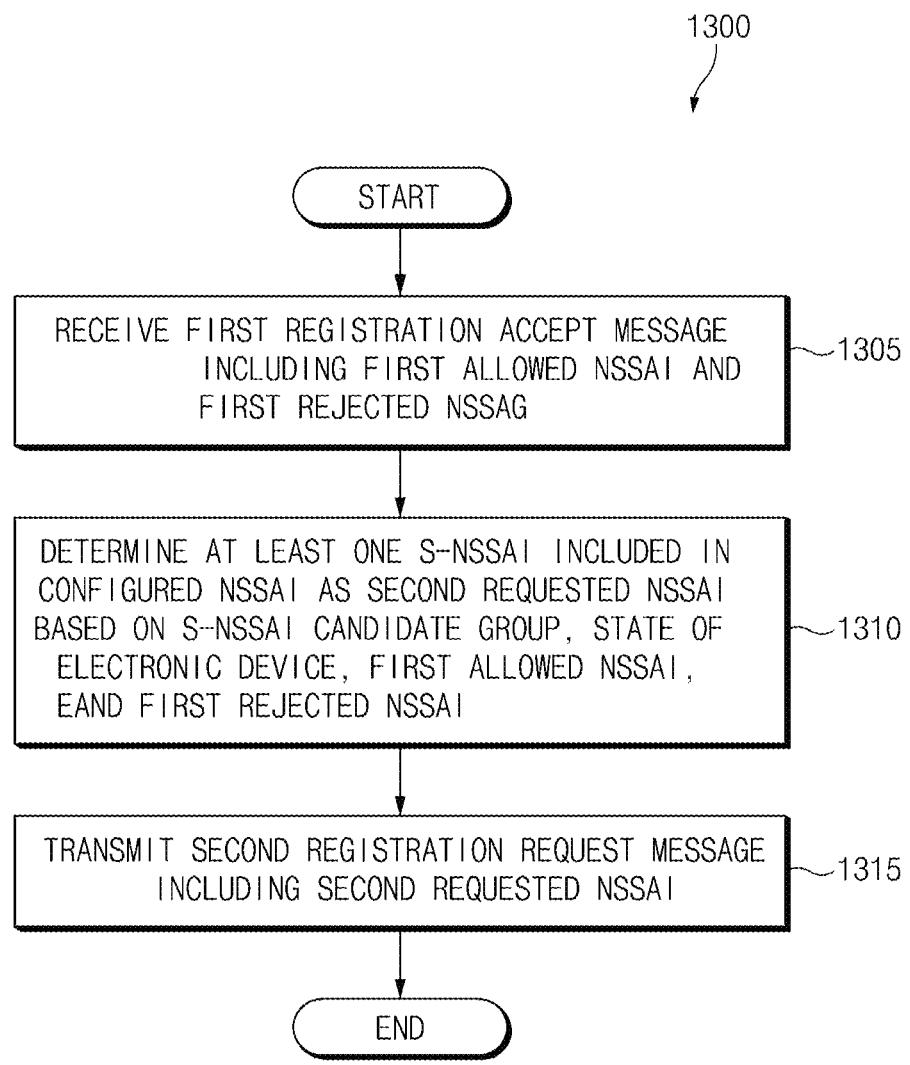
FIG. 13 illustrates an operational flowchart of an electronic device for determining at least one s-NSSAI as a second requested NSSAI according to various embodiments.

FIG. 13 illustrates an operational flowchart 1300 of an electronic device 101 for determining at least one s-NSSAI as a second requested NSSAI based on a first allowed NSSAI and a first rejected NSSAI according to various embodiments. FIG. 13 illustrates only an operation based on a first allowed NSSAI and a first rejected NSSAI, but the same principle is applicable to an operation of determining a requested NSSAI based on an Nth allowed NSSAI and an Nth rejected NSSAI. Operations included in the operational flowchart 1300 may be performed after operation 1220 of FIG. 12 is performed.

Referring to FIG. 13, according to an embodiment, in operation 1305, the electronic device 101 may receive a first registration accept message including a first allowed NSSAI and a first rejected NSSAI. The electronic device 101 may store the first allowed NSSAI and the first rejected NSSAI in a memory (e.g., a memory 130 of FIG. 1) of the electronic device 101. According to an embodiment, the electronic device 101 may store s-NSSAIs included in the first allowed NSSAI for each RA. For another example, the electronic device 101 may store s-NSSAIs included in the first rejected NSSAI for each RA or PLMN. The electronic device 101 may determine priorities of the s-NSSAIs included in the first allowed NSSAI based on counters of the s-NSSAIs included in the first allowed NSSAI.

According to an embodiment, in operation 1310, the electronic device 101 may determine at least one of a plurality of s-NSSAIs included in a configured NSSAI as a second requested NSSAI based on an s-NSSAI candidate group, a state of the electronic device 101, the first allowed NSSAI, and the first rejected NSSAI. According to an embodiment, the electronic device 101 may first determine at least one s-NSSAI corresponding to the state of the electronic device 101. For example, in Tables 2 and 3 above, when s-NSSAIs for supporting an auto mode is A and M and when a user of the electronic device 101 selects an operation mode of the electronic device 101 as the auto mode, the electronic device 101 may determine A and M as a second requested NSSAI. When all the requested s-NSSAIs are rejected from a network, the electronic device 101 may determine a requested NSSAI depending on the method described with reference to FIGS. 7 to 11.

3. Format of Requested NSSAI Field

Figure 14:
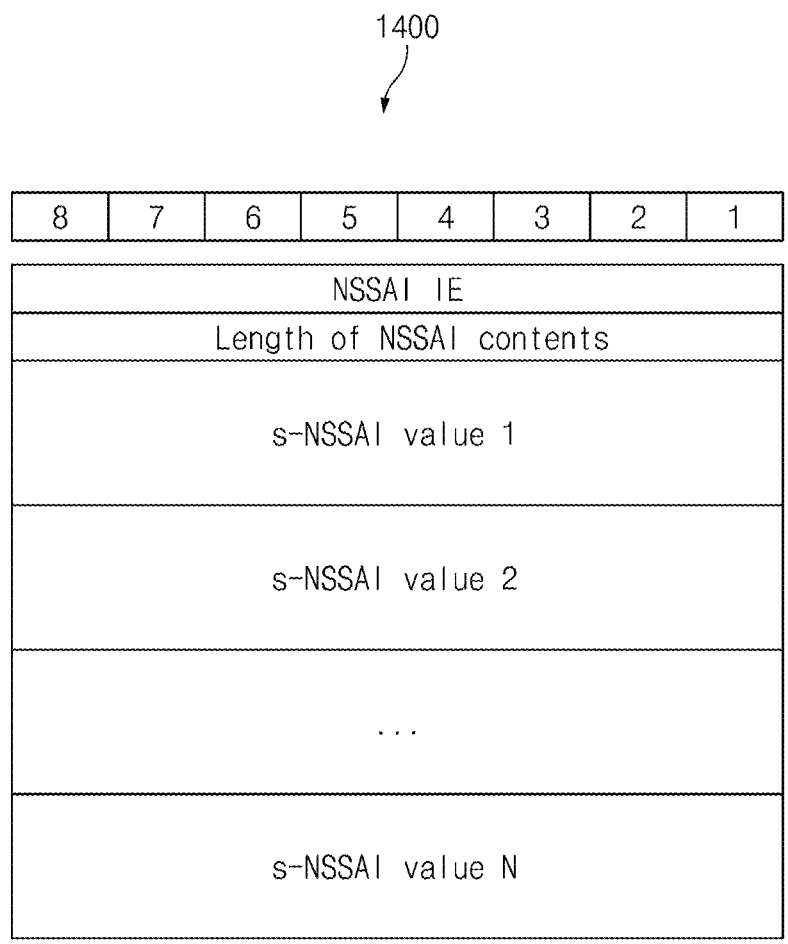
FIG. 14 illustrates a drawing of one example of a format of a requested NSSAI field.
Figure 15:
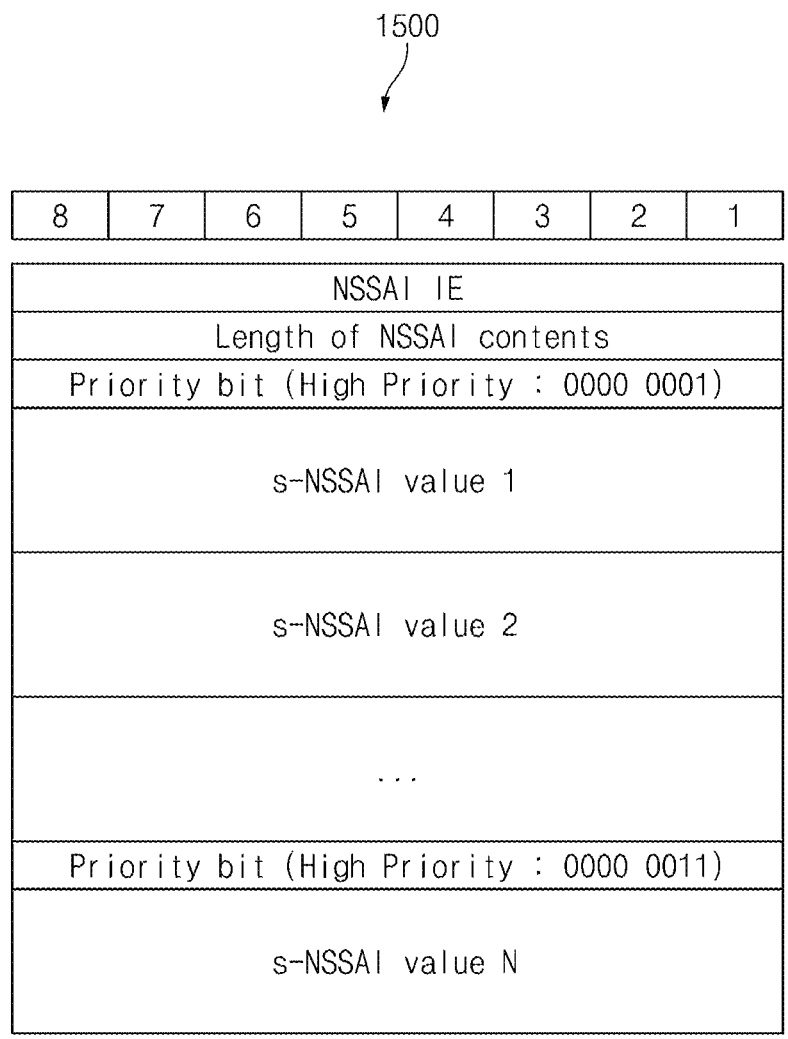
FIG. 15 illustrates a drawing of another example of a format of a requested NSSAI field.

When there are priorities of s-NSSAIs included in a requested NSSAI, the electronic device 101 may insert information indicating priorities into a requested NSSAI field of a registration request message transmitted to a network. FIGS. 14 and 15 illustrate a format of a requested NSSAI field indicating priorities of s-NSSAIs according to various embodiments.

Referring to FIG. 14 according to an embodiment, a requested NSSAI field (e.g., a requested NSSAI field 1400) may include s-NSSAIs, determined as a requested NSSAI, after an NSSAI information (IE) field and a field indicating a length of NSSAI contents. According to an embodiment, the requested NSSAI field may sequentially include bit information (e.g., octet information) indicating an s-NSSAI in order of priority. For example, when there are high priorities in an order of s-NSSAI value 1, s-NSSAI value 2, . . . , and s-NSSAI value N (N is a natural number), bit information indicating s-NSSAI value 1 may be first disposed (e.g., after a field indicating a length of NSSAI contents) and bit information of s-NSSAI value N may be finally located.

Referring to FIG. 15 according to another embodiment, a requested NSSAI field (e.g., a requested NSSAI field 1500) may include separate bit information (e.g., octet information) indicating a priority. For example, an electronic device (e.g., an electronic device 101 of FIG. 1) may classify s-NSSAIs into a first group (e.g., s-NSSAI value 1 and s-NSSAI value 2) having a high priority and a second group (e.g., s-NSSAI value N) having a low priority. In this case, bit information (e.g., '0000 0001' or '0') indicating a high priority may be disposed at an upper end of bit information of the s-NSSAIs of the first group, and bit information (e.g., '0000 0011' or '1') indicating a low priority may be disposed at an upper end of bit information of the s-NSSAIs of the second group.

As described above, an electronic device (e.g., an electronic device 101 of FIG. 1) may include a wireless communication circuitry (e.g., at least a part of a wireless communication circuitry 192 of FIG. 2), a processor (e.g., a processor 120 of FIG. 1) operatively connected with the wireless communication circuitry, and a memory (e.g., a memory 130 of FIG. 1), operatively connected with the processor, storing configured network slice selection assistance information (NSSAI) and an application. The memory may store instructions, when executed, causing the processor to, when the electronic device is booted, identify a single-NSSAI (s-NSSAI) candidate group including at least one s-NSSAI based on configuration information of the application, determine a specified number of s-NSSAIs among at least one s-NSSAI included in the configured NSSAI as a first requested NSSAI based on the number of s-NSSAIs included in the configured NSSAI and the s-NSSAI candidate group, and transmit a first registration request message including the first requested NSSAI, via the wireless communication circuitry.

According to an embodiment, the instructions may cause the processor to, when the number of the s-NSSAIs included in the configured NSSAI is less than or equal to the specified number, determine the at least one s-NSSAI included in the configured NSSAI as the first requested NSSAI and, when the number of the s-NSSAIs included in the configured NSSAI is greater than the specified number, determine the first requested NSSAI based on a priority of the at least one s-NSSAI included in the s-NSSAI candidate group.

According to an embodiment, the instructions may cause the processor to receive a first registration accept message including a first allowed NSSAI and a first rejected NSSAI, via the wireless communication circuitry, determine the specified number of s-NSSAIs among the at least one s-NSSAI included in the configured NSSAI as a second requested NSSAI, based on the s-NSSAI candidate group, the first allowed NSSAI, and the first rejected NSSAI, and transmit a second registration request message including the second requested NSSAI, via the wireless communication circuitry.

According to an embodiment, the instructions may cause the processor to, when the number of s-NSSAIs which are included in the configured NSSAI, the s-NSSAI candidate group, and the first allowed NSSAI and are not included in the first rejected NSSAI is less than or equal to the specified number, further determine at least one s-NSSAI, which is included in the first allowed NSSAI and is not included in the s-NSSAI candidate group and the first rejected NSSAI, as the second requested NSSAI and, when the number of s-NSSAIs which are included in the configured NSSAI, the s-NSSAI candidate group, and the first allowed NSSAI and are not included in the first rejected NSSAI is greater than the specified number, determine the second requested NSSAI based on a priority of at least one s-NSSAI included in the first allowed NSSAI.

According to an embodiment, the instructions may cause the processor to insert at least one parameter of at least one s-NSSAI forming the second requested NSSAI into a second requested NSSAI field in order of priority.

According to an embodiment, the instructions may cause the processor to insert bit information for distinguishing an s-NSSAI having a high priority from an s-NSSAI having a low priority among at least one parameter of at least one s-NSSAI forming the second requested NSSAI into a second requested NSSAI field.

According to an embodiment, the instructions may cause the processor to receive an Nth (where N is a natural number of greater than or equal to 2) registration accept message including an Nth allowed NSSAI, via the wireless communication circuitry, determine the specified number of s-NSSAIs among the at least one s-NSSAI included in the configured NSSAI as an N+1th requested NSSAI based on the s-NSSAI candidate group, the Nth allowed NSSAI, and the first rejected NSSAI, and transmit an N+1th registration request message including the N+1th requested NSSAI, via the wireless communication circuitry.

According to an embodiment, the instructions may cause the processor to, when the number of s-NSSAIs which are included in the s-NSSAI candidate group and the Nth allowed NSSAI and are not included in the first rejected NSSAI is less than or equal to the specified number, further determine at least one s-NSSAI, which is included in the Nth allowed NSSAI and is not included in the s-NSSAI candidate group and the first rejected NSSAI, as the N+1th request NSSAI and, when the number of the s-NSSAIs which are included in the s-NSSAI candidate group and the Nth allowed NSSAI and are not included in the first rejected NSSAI is greater than the specified number, determine the N+1th requested NSSAI based on a priority of at least one s-NSSAI included in the Nth allowed NSSAI.

As described above, an electronic device for supporting a wireless communication network may include a wireless communication circuitry, a processor operatively connected with the wireless communication circuitry, and a memory, operatively connected with the processor, storing a configured NSSAI and an application. The memory may store instructions, when executed, causing the processor to, when the electronic device is booted, identify an s-NSSAI candidate group including at least one s-NSSAI based on configuration information of the application, identify a state of the electronic device, determine at least one s-NSSAI included in the configured NSSAI as a first requested NSSAI based on the state of the electronic device and the s-NSSAI candidate group, and transmit a first registration request message including the first requested NSSAI, via the wireless communication circuitry.

According to an embodiment, the state of the electronic device may include at least one of an operation mode of the electronic device or a service mode of the electronic device. The operation mode may include at least one of a power save mode, a game mode, a data save mode, a high-performance mode, or an auto mode. The service mode may include at least one of enhanced mobile broadband (eMBB), ultra-reliable and low latency communication (URLLC), or massive machine type communication (mMTC).

According to an embodiment, the instructions may cause the processor to receive a first registration accept message including a first allowed NSSAI and a first rejected NSSAI, via the wireless communication circuitry, determine at least one s-NSSAI included in the configured NSSAI as a second requested NSSAI based on the state of the electronic device and the s-NSSAI candidate group, and transmit a second registration request message including the second requested NSSAI, via the wireless communication circuitry.

According to an embodiment, the instructions may cause the processor to determine a priority of at least one s-NSSAI forming the second requested NSSAI, based on a priority of at least one s-NSSAI corresponding to the state of the electronic device and insert at least one parameter of the at least one s-NSSAI forming the second requested NSSAI into a second requested NSSAI field in order of a priority of the at least one s-NSSAI forming the second requested NSSAI.

According to an embodiment, the instructions may cause the processor to determine a priority of the at least one s-NSSAI forming the second requested NSSAI, based on a priority of the at least one s-NSSAI corresponding to the state of the electronic device and insert bit information for distinguishing an s-NSSAI having a high priority from an s-NSSAI having a low priority among at least one parameter of the at least one s-NSSAI forming the second requested NSSAI into a second requested NSSAI field.

According to an embodiment, the instructions may cause the processor to receive a second registration response message including a second allowed NSSAI and a second rejected NSSAI, via the wireless communication circuitry, when at least one s-NSSAI included in the second requested NSSAI is included in the second rejected NSSAI, determine at least one s-NSSAI included in the configured NSSAI as a third requested NSSAI based on the s-NSSAI candidate group, the second allowed NSSAI, and the second rejected NSSAI, and transmit a third registration request message including the third requested NSSAI, via the wireless communication circuitry.

As described above, a method of an electronic device may include, when the electronic device is booted, identifying an s-NSSAI candidate group including at least one s-NSSAI based on configuration information of an application, determining a specified number of s-NSSAIs included in a configured NSSAI as a first requested NSSAI based on the number of s-NSSAIs included in the configured NSSAI and the s-NSSAI candidate group and transmitting a first registration request message including the first requested NSSAI.

According to an embodiment, the determining of the first requested NSSAI may include, when the number of the s-NSSAIs included in the configured NSSAI is less than or equal to the specified number, determining at least one s-NSSAI included in the configured NSSAI as the first requested NSSAI and, when the number of the s-NSSAIs included in the configured NSSAI is greater than the specified number, determining the first requested NSSAI based on a priority of the at least one s-NSSAI included in the s-NSSAI candidate group.

According to an embodiment, the method may further include receiving a first registration accept message including a first allowed NSSAI and a first rejected NSSAI, determining a specified number of s-NSSAIs among the at least one s-NSSAI included in the configured NSSAI as a second requested NSSAI, based on the s-NSSAI candidate group, the first allowed NSSAI, and the first rejected NSSAI, and transmitting a second registration request message including the second requested NSSAI.

According to an embodiment, the determining of the second requested NSSAI may include, when the number of s-NSSAIs which are included in the configured NSSAI, the s-NSSAI candidate group, and the first allowed NSSAI and are not included in the first rejected NSSAI is less than or equal to the specified number, further determining at least one s-NSSAI, which is included in the first allowed NSSAI and is not included in the s-NSSAI candidate group and the first rejected NSSAI, as the second requested NSSAI or, when the number of the s-NSSAIs which are included in the configured NSSAI, the s-NSSAI candidate group, and the first allowed NSSAI and are not included in the first rejected NSSAI is greater than the specified number, determining the second requested NSSAI based on a priority of at least one s-NSSAI included in the first allowed NSSAI.

According to an embodiment, the method may further include receiving an Nth (where N is a natural number of greater than or equal to 2) registration accept message including an Nth allowed NSSAI, determining the specified number of s-NSSAIs among s-NSSAIs included in the configured NSSAI as an N+1th requested NSSAI based on the s-NSSAI candidate group, the Nth allowed NSSAI, and the first rejected NSSAI, and transmitting an N+1th registration request message including the N+1th requested NSSAI.

According to an embodiment, the determining of the N+1th requested NSSAI may include, when the number of s-NSSAIs which are included in the s-NSSAI candidate group and the Nth allowed NSSAI and are not included in the first rejected NSSAI is less than or equal to the specified number, further determining at least one s-NSSAI, which is included in the Nth allowed NSSAI and is not included in the s-NSSAI candidate group and the first rejected NSSAI, as the N+1th request NSSAI or, when the number of the s-NSSAIs which are included in the s-NSSAI candidate group and the Nth allowed NSSAI and are not included in the first rejected NSSAI is greater than the specified number, determining the N+1th requested NSSAI based on a priority of at least one s-NSSAI included in the Nth allowed NSSAI.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the present disclosure, the electronic device may determine a requested NSSAI with regard to a network slice suitable for a service type or QoS required by the application.

In addition, various effects directly or indirectly ascertained through the present disclosure may be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
   wireless communication circuitry;
   a processor operatively connected with the wireless communication circuitry; and
   a memory, operatively connected with the processor, storing configured network slice selection assistance information (NSSAI) and an application,
   wherein the memory stores instructions that, when executed, cause the processor to:
   when the electronic device is booted, identify a single-NSSAI (s-NSSAI) candidate group including at least one s-NSSAI, based on configuration information of the application;
   determine a specified number of s-NSSAIs among at least one s-NSSAI included in the configured NSSAI as a first requested NSSAI based on a number of s-NSSAIs included in the configured NSSAI and the s-NSSAI candidate group; and
   transmit a first registration request message including the first requested NSSAI, via the wireless communication circuitry.

2. The electronic device of claim 1, wherein the instructions further cause the processor to:
   when a number of s-NSSAIs included in the configured NSSAI is less than or equal to the specified number, determine the at least one s-NSSAI included in the configured NSSAI as the first requested NSSAI; and
   when the number of the s-NSSAIs included in the configured NSSAI is greater than the specified number, determine the first requested NSSAI based on a priority of the at least one s-NSSAI included in the s-NSSAI candidate group.

3. The electronic device of claim 1, wherein the instructions further cause the processor to:
   receive a first registration accept message including a first allowed NSSAI and a first rejected NSSAI, via the wireless communication circuitry;
   determine the specified number of s-NSSAIs among the at least one s-NSSAI included in the configured NSSAI as a second requested NSSAI, based on the s-NSSAI candidate group, the first allowed NSSAI, and the first rejected NSSAI; and
   transmit a second registration request message including the second requested NSSAI, via the wireless communication circuitry.

4. The electronic device of claim 3, wherein the instructions further cause the processor to:
   when a number of s-NSSAIs included in the configured NSSAI, the s-NSSAI candidate group, and the first allowed NSSAI and not included in the first rejected NSSAI is less than or equal to the specified number, determine at least one s-NSSAI, which is included in the first allowed NSSAI and is not included in the s-NSSAI candidate group and the first rejected NSSAI, as the second requested NSSAI; and
   when the number of the s-NSSAIs included in the configured NSSAI, the s-NSSAI candidate group, and the first allowed NSSAI and not included in the first rejected NSSAI is greater than the specified number, determine the second requested NSSAI based on a priority of at least one s-NSSAI included in the first allowed NSSAI.

5. The electronic device of claim 4, wherein the instructions further cause the processor to:
   insert at least one parameter of at least one s-NSSAI forming the second requested NSSAI into a second requested NSSAI field in order of priority.

6. The electronic device of claim 4, wherein the instructions further cause the processor to:
   insert bit information for distinguishing an s-NSSAI having a highest priority from an s-NSSAI having a lowest priority among at least one parameter of at least one s-NSSAI forming the second requested NSSAI into a second requested NSSAI field.

7. The electronic device of claim 4, wherein the instructions further cause the processor to:
   receive an Nth registration accept message including an Nth allowed NSSAI, via the wireless communication circuitry, where N is a natural number that is greater than or equal to 2;
   determine the specified number of s-NSSAIs among the at least one s-NSSAI included in the configured NSSAI as an N+1th requested NSSAI based on the s-NSSAI candidate group, the Nth allowed NSSAI, and the first rejected NSSAI; and
   transmit an N+1th registration request message including the N+1th requested NSSAI, via the wireless communication circuitry.

8. The electronic device of claim 7, wherein the instructions further cause the processor to:
   when a number of s-NSSAIs included in the s-NSSAI candidate group and the Nth allowed NSSAI and not included in the first rejected NSSAI is less than or equal to the specified number, determine at least one s-NSSAI, which is included in the Nth allowed NSSAI and is not included in the s-NSSAI candidate group and the first rejected NSSAI, as the N+1th request NSSAI; and
   when the number of the s-NSSAIs included in the s-NSSAI candidate group and the Nth allowed NSSAI and not included in the first rejected NSSAI is greater than the specified number, determine the N+1th requested NSSAI based on a priority of at least one s-NSSAI included in the Nth allowed NSSAI.

9. An electronic device for supporting a wireless communication network, the electronic device comprising:
   wireless communication circuitry;
   a processor operatively connected with the wireless communication circuitry; and
   a memory, operatively connected with the processor, storing a configured network slice selection assistance information (NSSAI) and an application,
   wherein the memory stores instructions that, when executed, cause the processor to:
   when the electronic device is booted, identify a single-NSSAI (s-NSSAI) candidate group including at least one s-NSSAI based on configuration information of the application;
   identify a state of the electronic device;
   determine at least one first s-NSSAI included in the configured NSSAI as a first requested NSSAI based on the state of the electronic device and the s-NSSAI candidate group; and
   transmit a first registration request message including the first requested NSSAI, via the wireless communication circuitry.

10. The electronic device of claim 9, wherein the state of the electronic device includes at least one of: an operation mode of the electronic device or a service mode of the electronic device,
 wherein the operation mode includes at least one of: a power save mode, a game mode, a data save mode, a high-performance mode, or an auto mode, and
 wherein the service mode includes at least one of: enhanced mobile broadband (eMBB), ultra-reliable and low latency communication (URLLC), or massive machine type communication (mMTC).

11. The electronic device of claim 10, wherein the instructions further cause the processor to:
 receive a first registration accept message including a first allowed NSSAI and a first rejected NSSAI, via the wireless communication circuitry;
 determine at least one second s-NSSAI included in the configured NSSAI as a second requested NSSAI based on the state of the electronic device and the s-NSSAI candidate group; and
 transmit a second registration request message including the second requested NSSAI, via the wireless communication circuitry.

12. The electronic device of claim 11, wherein the instructions further cause the processor to:
 determine a priority of at least one s-NSSAI forming the second requested NSSAI, based on a priority of at least one s-NSSAI corresponding to the state of the electronic device; and
 insert at least one parameter of the at least one s-NSSAI forming the second requested NSSAI into a second requested NSSAI field in an order of a priority of the at least one s-NSSAI forming the second requested NSSAI.

13. The electronic device of claim 11, wherein the instructions further cause the processor to:
 determine a priority of the at least one s-NSSAI forming the second requested NSSAI, based on a priority of the at least one s-NSSAI corresponding to the state of the electronic device; and
 insert bit information for distinguishing an s-NSSAI having a high priority from an s-NSSAI having a low priority among at least one parameter of the at least one s-NSSAI forming the second requested NSSAI into a second requested NSSAI field.

14. The electronic device of claim 11, wherein the instructions further cause the processor to:
 receive a second registration response message including a second allowed NSSAI and a second rejected NSSAI, via the wireless communication circuitry;
 when at least one s-NSSAI included in the second requested NSSAI is included in the second rejected NSSAI, determine at least one third s-NSSAI included in the configured NSSAI as a third requested NSSAI based on the s-NSSAI candidate group, the second allowed NSSAI, and the second rejected NSSAI; and
 transmit a third registration request message including the third requested NSSAI, via the wireless communication circuitry.

15. A method of an electronic device, the method comprising:
 when the electronic device is booted, identifying a single-network slice selection assistance information (s-NSSAI) candidate group including at least one s-NSSAI based on configuration information of an application;
 determining a specified number of s-NSSAIs included in a configured network slice selection assistance information (NSSAI) as a first requested NSSAI based on a number of s-NSSAIs included in the configured NSSAI and the s-NSSAI candidate group; and
 transmitting a first registration request message including the first requested NSSAI.

16. The method of claim 15, wherein the determining of the first requested NSSAI includes:
 when a number of s-NSSAIs included in the configured NSSAI is less than or equal to the specified number, determining at least one s-NSSAI included in the configured NSSAI as the first requested NSSAI; or
 when the number of the s-NSSAIs included in the configured NSSAI is greater than the specified number, determining the first requested NSSAI based on a priority of the at least one s-NSSAI included in the s-NSSAI candidate group.

17. The method of claim 15, further comprising:
 receiving a first registration accept message including a first allowed NSSAI and a first rejected NSSAI;
 determining a specified number of s-NSSAIs among the at least one s-NSSAI included in the configured NSSAI as a second requested NSSAI, based on the s-NSSAI candidate group, the first allowed NSSAI, and the first rejected NSSAI; and
 transmitting a second registration request message including the second requested NSSAI.

18. The method of claim 17, wherein the determining of the second requested NSSAI includes:
 when a number of s-NSSAIs included in the configured NSSAI, the s-NSSAI candidate group, and the first allowed NSSAI and not included in the first rejected NSSAI is less than or equal to the specified number, further determining at least one s-NSSAI, which is included in the first allowed NSSAI and is not included in the s-NSSAI candidate group and the first rejected NSSAI, as the second requested NSSAI; and
 when the number of the s-NSSAIs included in the configured NSSAI, the s-NSSAI candidate group, and the first allowed NSSAI and not included in the first rejected NSSAI is greater than the specified number, determining the second requested NSSAI based on a priority of at least one s-NSSAI included in the first allowed NSSAI.

19. The method of claim 17, further comprising:
 receiving an Nth registration accept message including an Nth allowed NSSAI, where N is a natural number that is greater than or equal to 2;
 determining the specified number of s-NSSAIs among s-NSSAIs included in the configured NSSAI as an N+1th requested NSSAI based on the s-NSSAI candidate group, the Nth allowed NSSAI, and the first rejected NSSAI; and
 transmitting an N+1th registration request message including the N+1th requested NSSAI.

20. The method of claim 19, wherein the determining of the N+1th requested NSSAI includes:
 when a number of s-NSSAIs included in the s-NSSAI candidate group and the Nth allowed NSSAI and not included in the first rejected NSSAI is less than or equal to the specified number, further determining at least one s-NSSAI, which is included in the Nth allowed NSSAI and is not included in the s-NSSAI candidate group and the first rejected NSSAI, as the N+1th request NSSAI; and
 when the number of the s-NSSAIs included in the s-NSSAI candidate group and the Nth allowed NSSAI and not included in the first rejected NSSAI is greater than the specified number, determining the N+1th requested NSSAI based on a priority of at least one s-NSSAI included in the Nth allowed NSSAI.

\* \* \* \* \*